United States Patent
Kimura

(10) Patent No.: US 11,450,020 B2
(45) Date of Patent: Sep. 20, 2022

(54) INFORMATION PROCESSING APPARATUS, METHOD FOR PROCESSING INFORMATION, AND COMPUTER PROGRAM

(71) Applicant: Sony Corporation, Tokyo (JP)

(72) Inventor: Jun Kimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 263 days.

(21) Appl. No.: 16/649,140

(22) PCT Filed: Jul. 26, 2018

(86) PCT No.: PCT/JP2018/028135
§ 371 (c)(1),
(2) Date: Mar. 20, 2020

(87) PCT Pub. No.: WO2019/064872
PCT Pub. Date: Apr. 4, 2019

(65) Prior Publication Data
US 2020/0294265 A1    Sep. 17, 2020

(30) Foreign Application Priority Data

Sep. 29, 2017    (JP) .............................. JP2017-190908

(51) Int. Cl.
*G06T 7/73* (2017.01)
*G02B 27/01* (2006.01)
(Continued)

(52) U.S. Cl.
CPC .............. *G06T 7/73* (2017.01); *G02B 27/017* (2013.01); *G02B 27/0179* (2013.01);
(Continued)

(58) Field of Classification Search
None
See application file for complete search history.

(56) References Cited

U.S. PATENT DOCUMENTS

2015/0097719 A1    4/2015 Balachandreswaran et al.
2017/0178272 A1    6/2017 Lashkari et al.
(Continued)

FOREIGN PATENT DOCUMENTS

JP        9-225136 A      9/1997
JP     2014-127124 A      7/2014
(Continued)

OTHER PUBLICATIONS

International Search Report and Written Opinion dated Sep. 18, 2018 for PCT/JP2018/028135 filed on Jul. 26, 2018, 9 pages including English Translation of the International Search Report.
(Continued)

*Primary Examiner* — Jwalant Amin
(74) *Attorney, Agent, or Firm* — Xsensus LLP

(57) ABSTRACT

[Problem] Presented are an information processing apparatus, a method for processing information, and a computer program that can control information output adaptively to positional information and directional information of each user.

[Solution] Provided is an information processing apparatus including an information acquisition unit acquiring positional information of a first place with which first information is associated and positional information and directional information of each of a plurality of first users and an output controller controlling output of the first information by a first output unit carried by each of the first users based on the positional information of the first place and the positional information and the directional information of each of the first users.

17 Claims, 16 Drawing Sheets

(51) Int. Cl.
    *G06T 19/00*     (2011.01)
    *G06F 1/16*     (2006.01)
    *A63F 13/428*     (2014.01)

(52) U.S. Cl.
    CPC .............. *G06F 1/163* (2013.01); *G06T 19/00* (2013.01); *G06T 19/003* (2013.01); *A63F 13/428* (2014.09); *G02B 2027/0187* (2013.01)

(56) References Cited

U.S. PATENT DOCUMENTS

2017/0358140 A1* 12/2017 Kohler ............... G02B 27/0172
2018/0357836 A1* 12/2018 Ishiguro ................. G06V 20/20
2018/0374026 A1* 12/2018 Osawa .................... G06F 9/453

FOREIGN PATENT DOCUMENTS

| | | |
|---|---|---|
| JP | 2014-178982 A | 9/2014 |
| JP | 2017-146963 A | 8/2017 |

OTHER PUBLICATIONS

Ohshima, T., et al., "RV-Border Guards: A Multi-player Mixed Reality Entertainment," Transactions of the Virtual Reality Society of Japan, ISSN 1344-0IIX, vol. 4, No. 4, Mar. 3, 2000, pp. 699-705.

\* cited by examiner

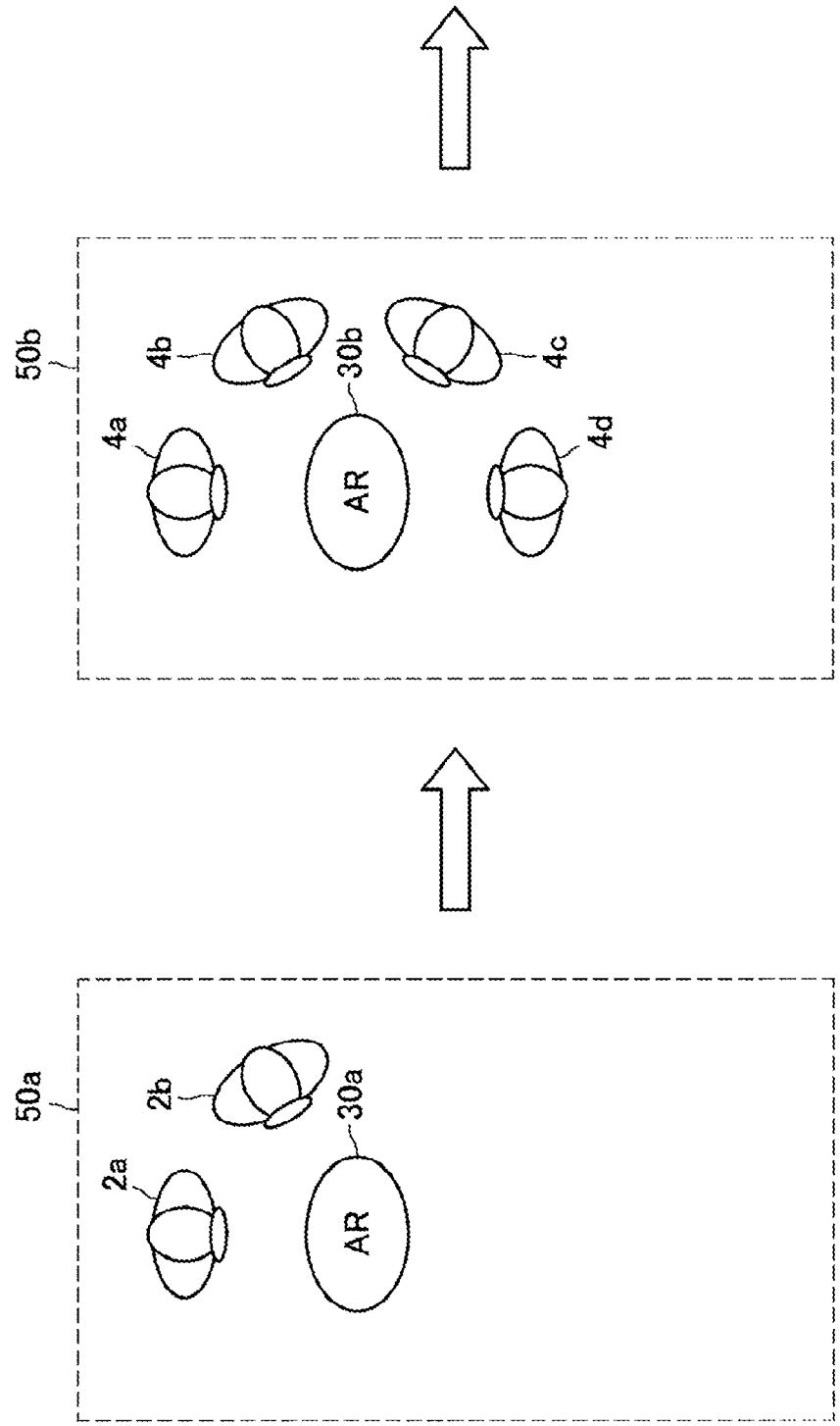

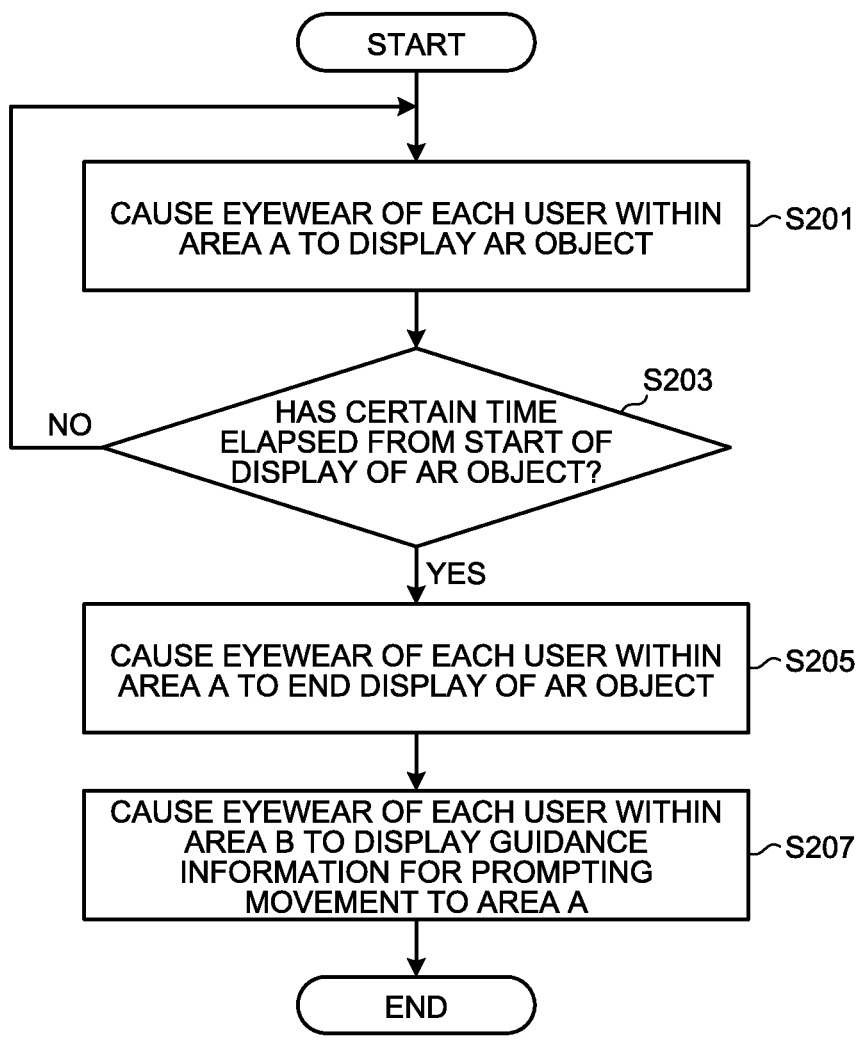

INFORMATION PROCESSING APPARATUS, METHOD FOR PROCESSING INFORMATION, AND COMPUTER PROGRAM

CROSS-REFERENCE TO RELATED APPLICATIONS

The present application is based on PCT filing PCT/JP2018/028135, filed Jul. 26, 2018, which claims priority to JP 2017-190908, filed Sep. 29, 2017, the entire contents of each are incorporated herein by reference.

FIELD

The present disclosure relates to an information processing apparatus, a method for processing information, and a computer program.

BACKGROUND

Conventionally, various kinds of techniques about augmented reality (AR) have been developed. AR can present to users various kinds of information (e.g., virtual objects) in association with the positions of the users in a real space.

Patent Literature 1 describes a technique that, in accordance with recognition of a gesture of a user, makes a display position of a user interface (UI) object close to the user, for example.

CITATION LIST

Patent Literature

Patent Literature 1: JP 2014-127124 A

SUMMARY

Technical Problem

However, the technique described in Patent Literature 1 does not consider appropriate control of information output in accordance with positional information and directional information of each user.

Given these circumstances, the present disclosure presents an information processing apparatus, a method for processing information, and a computer program that are novel and improved and can control information output adaptively to the positional information and the directional information of each user.

Solution to Problem

According to the present disclosure, an information processing apparatus is provided that includes: an information acquisition unit that acquires positional information of a first place with which first information is associated and positional information and directional information of each of a plurality of first users; and an output controller that controls output of the first information by a first output unit carried by each of the first users based on the positional information of the first place and the positional information and the directional information of each of the first users.

Moreover, according to the present disclosure, an information processing apparatus is provided that includes: an information acquisition unit that acquires positional information of a first place with which first information is associated and positional information and directional information of each of a plurality of first users belonging to a first group; and an output controller that causes an output unit carried by each of a plurality of second users belonging to a second group to output guidance information for prompting movement to the first place based on the positional information of the first place and the positional information and the directional information of each of the first users.

Moreover, according to the present disclosure, a method for processing information is provided that includes: acquiring positional information of a first place with which first information is associated and positional information and directional information of each of a plurality of first users; and by a processor, controlling output of the first information by a first output unit carried by each of the first users based on the positional information of the first place and the positional information and the directional information of each of the first users.

Moreover, according to the present disclosure, a computer program is provided that causes a computer to function as: an information acquisition unit that acquires positional information of a first place with which first information is associated and positional information and directional information of each of a plurality of first users; and an output controller that controls output of the first information by a first output unit carried by each of the first users based on the positional information of the first place and the positional information and the directional information of each of the first users.

Advantageous Effects of Invention

As described above, the present disclosure can control information output adaptively to the positional information and the directional information of each user. The effect described here is not necessarily limiting and may be any of effects described in the present disclosure.

BRIEF DESCRIPTION OF DRAWINGS

FIG. 12A is a diagram illustrating how separate groups are positioned in respective two areas 50.

FIG. 13 is a flowchart of a processing procedure according to a second embodiment.

DESCRIPTION OF EMBODIMENTS

The following describes preferred embodiments of the present disclosure in detail with reference to the accompanying drawings. In the present specification and the drawings, components having substantially the same functional configuration are denoted by the same symbol, thereby omitting a duplicate description.

In the present specification and the drawings, a plurality of components having substantially the same functional configuration may be distinguished from each other by adding different alphabets to the rear of the same symbol. The components having substantially the same functional configuration are distinguished from each other like eyewear 20a and eyewear 20b as needed, for example. Note that when there is no need to particularly distinguish the components having substantially the same functional configuration from each other, they are denoted only by the same symbol. When there is no need to particularly distinguish the eyewear 20a and the eyewear 20b from each other, they are referred to simply as eyewear 20, for example.

Figure 1:
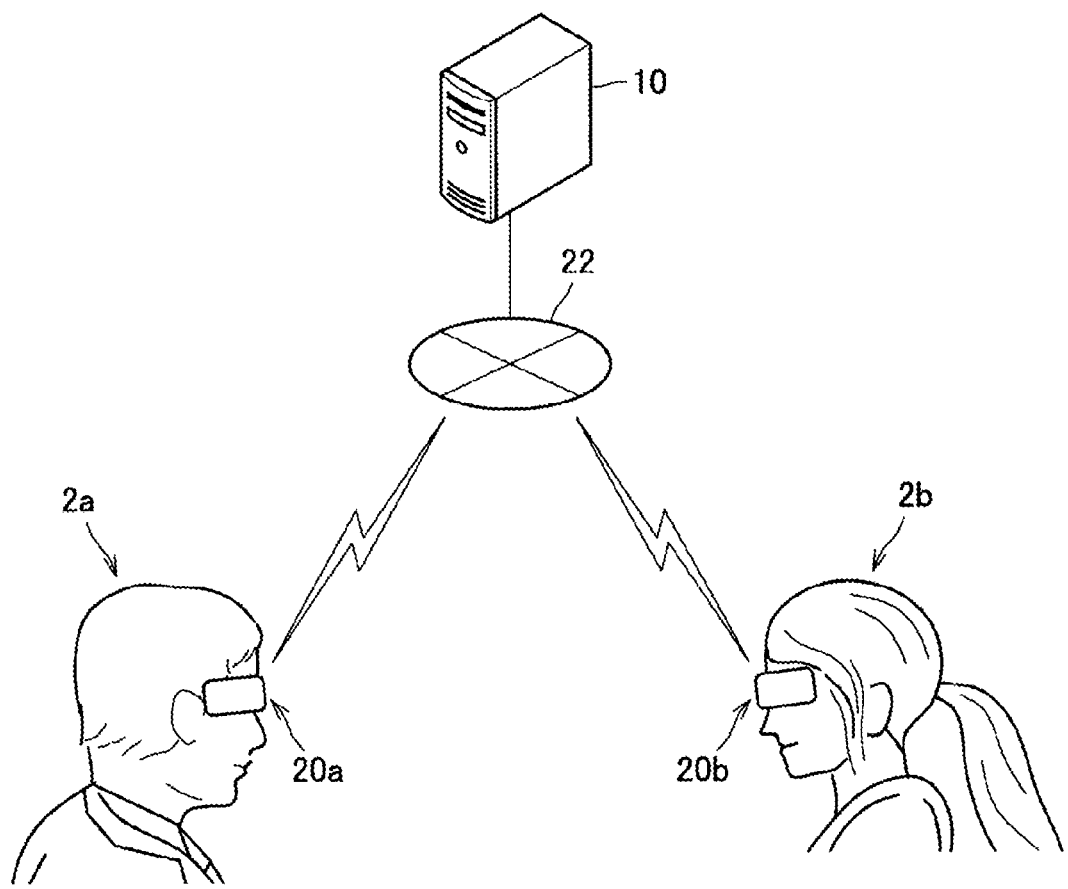
FIG. 1 is an illustrative diagram of a configuration example of an information processing system common to embodiments of the present disclosure.

The "Description of Embodiments" will be described in accordance with the following order of items:
1. Configuration of Information Processing System
2. First Embodiment
3. Second Embodiment
4. Application Examples
5. Hardware Configuration
6. Modifications 1. Configuration of Information Processing System The following first describes a configuration example of an information processing system common to embodiments of the present disclosure with reference to FIG. 1. As illustrated in FIG. 1, this information processing system according to the embodiments has a server 10, eyewear 20, and a communication network 22.

1-1. Server 10

The server 10 is an apparatus controlling information output to the eyewear 20 described below. When it is detected that a user has approached a place with which an AR object is associated, for example, the server 10 transmits control information for causing the eyewear 20 worn by the user to display the corresponding AR object to the eyewear 20 via the communication network 22 described below. The "place" can be a place within a real space.

However, not limited to such an example, the "place" may be a place within a virtual space. In this case, when it is detected that a user has approached a place with which a virtual object is associated within the virtual space, the server 10 may cause the eyewear 20 worn by the user to display the virtual object. The following mainly describes an example in which the "place" is a place within the real space.

1-2. Eyewear 20

As illustrated in FIG. 1, the eyewear 20 can be a device of a head-mounted type (e.g., a glasses type or a goggles type). The eyewear 20 may be AR glasses, a video see-through head-mounted display (HMD), or an occlusive HMD, for example. The present embodiment can basically assume a scene in which each user wears the eyewear 20.

The eyewear 20 can output various kinds of information (videos, voices, and the like) in accordance with control of the server 10, for example. The embodiments can assume a scene in which pieces of eyewear 20 worn by respective users start up the same application, for example. The application is a game application, for example. Specific examples of the type of the game include games in which a plurality of users in cooperation with each other defeat enemies moving through the streets, mystery games, touring games, creation games, and treasure hunting games.

1-3. Communication Network 22

The communication network 22 is a wired or wireless transmission path for information transmitted from apparatuses connected to the communication network 22. The communication network 22 may include public networks such as a telephone network, the Internet, and a satellite communication network, various kinds of local area networks (LANs) including Ethernet (registered trademark), and wide area networks (WANs), for example. The communication network 22 may include exclusive networks such as Internet protocol-virtual private networks (IP-VPNs).

The configuration of the information processing system common to the embodiments has been described. As described below, the server 10 according to the embodiments acquires positional information of a first place with which the AR object is associated and positional information and directional information of each of a plurality of users and controls output of the AR object by the eyewear 20 worn by each of the users based on the positional information of the first place and the positional information and the direction information of each of the users. With this operation, sharing of the AR object by the users can be assisted. The AR object is exemplary first information of the present disclosure.

2. First Embodiment 2-1. Configuration: Eyewear 20

Figure 2:
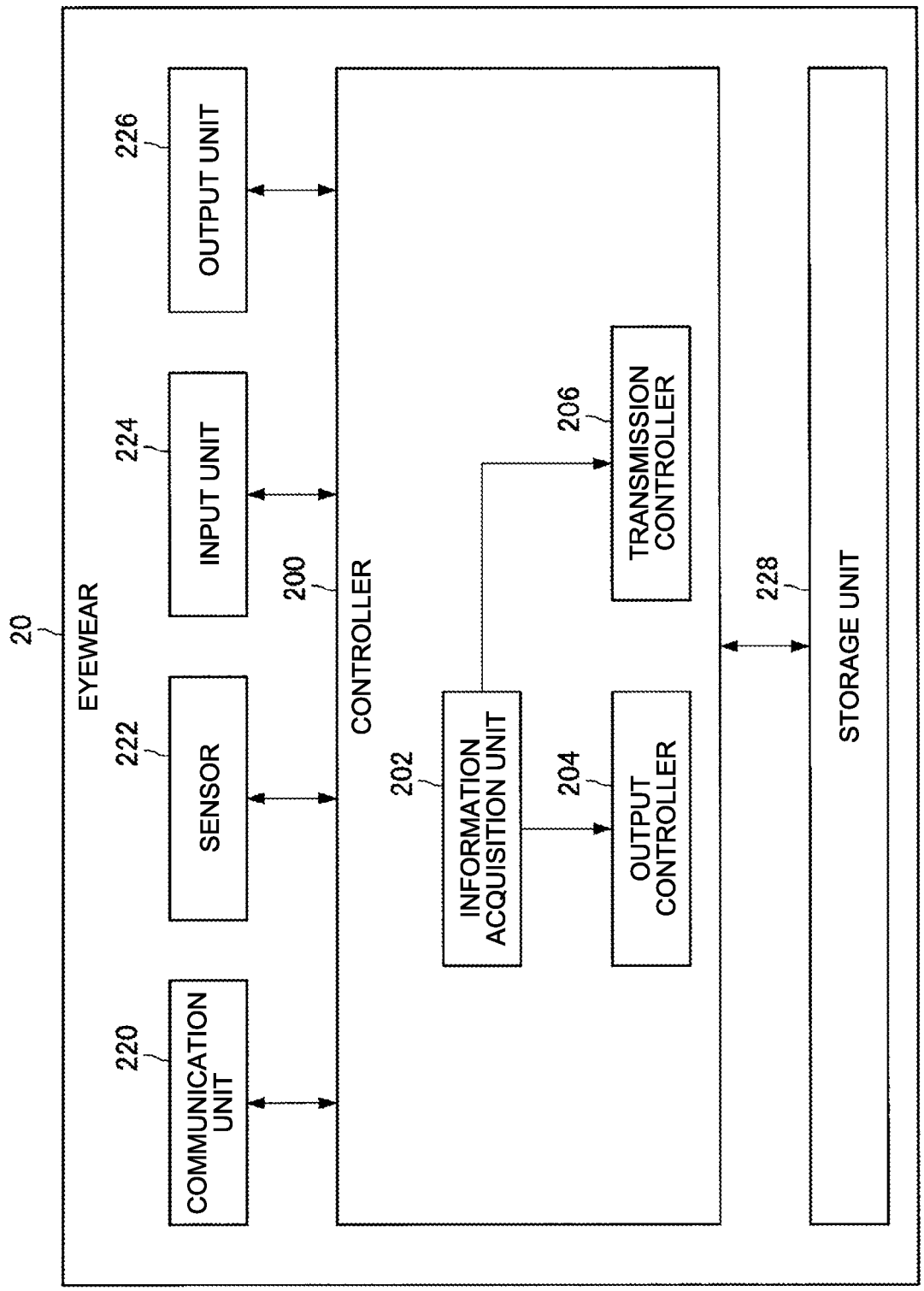
FIG. 2 is a functional block diagram of a configuration example of eyewear 20 according to a first embodiment.

The following first describes a first embodiment. FIG. 2 is a functional block diagram of a configuration example of the eyewear 20 according to the first embodiment. As illustrated in FIG. 2, the eyewear 20 has a controller 200, a communication unit 220, a sensor 222, an input unit 224, and an output unit 226, and a storage unit 228.

{2-1-1. Sensor 222}

The sensor 222 can include an outward camera (an image sensor), an inward camera, a depth sensor (e.g., a time-of-flight sensor, a structured light sensor, or a stereo camera), a microphone, an acceleration sensor, a gyroscope, a bearing sensor, a positioning unit, and/or a biological sensor, for example.

The sensor 222 can sense an environment in which a user is positioned. The sensor 222 estimates a self-position of the eyewear 20 to sense positional information and height information using a technique such as simultaneous localization and mapping (SLAM), for example. As an example, the sensor 222 recognizes a specific object positioned around the eyewear 20 and senses the distance to the object based on an image taken by the outward camera (of the sensor 222), a sensing result by the depth sensor, or the like. The sensor 222 acquires positional information of the object from a certain apparatus, for example, and estimates the self-position of the eyewear 20 based on the acquired positional information and the sensing result of the distance to the object. Additionally or alternatively, the positioning unit of the sensor 222 may successively position the positional information of the eyewear 20. The sensor 222 may combine a positioning result by the positioning unit and an estimation result of the self-position with each other to sense the positional information of the eyewear 20, for example.

The positioning unit can include a receiver receiving positioning signals from positioning satellites of the Global Positioning System (GPS), the Global Navigation Satellite System (GLONASS), or the like, for example. The positioning unit can receive positioning signals from one kind of satellite or receive positioning signals by a plurality of kinds of satellites and combine the received signals to measure a current position.

The sensor 222 can sense directional information indicating a direction in which the eyewear 20 is oriented based on a combination of a sensing result by the gyroscope and a sensing result by the acceleration sensor or the like.

Further, the outward camera of the sensor 222 can take an image ahead of the user while the user is wearing the eyewear 20, and the inward camera of the sensor 222 can take an image of the eyes of the user. With this operation, a line-of-sight direction of the user can be sensed.

{2-1-2. Controller 200}

The controller 200 can include a processing circuit such as a central processing unit (CPU) or a graphics processing unit (GPU), for example. The controller 200 comprehensively controls operation of the eyewear 20. As illustrated in FIG. 2, the controller 200 has an information acquisition unit 202, an output controller 204, and a transmission controller 206.

{2-1-3. Information Acquisition Unit 202}

The information acquisition unit 202 acquires a sensing result by the sensor 222 from the sensor 222. The information acquisition unit 202 acquires information that has been received by the communication unit 220 from an external apparatus (the server 10 or the like) by performing reception or reading processing, for example.

{2-1-4. Output Controller 204}

The output controller 204 causes the output unit 226 to output the information acquired by the information acquisition unit 202. When control information for displaying the AR object is received from the server 10, for example, the output controller 204 causes the output unit 226 to output the corresponding AR object in accordance with the control information.

{2-1-5. Transmission Controller 206}

The transmission controller 206 controls transmission of various kinds of information to other apparatuses. The transmission controller 206 causes the communication unit 220 to transmit the positional information and the directional information of the eyewear 20 sensed by the sensor 222 to the server 10, for example. Further, the transmission controller 206 may further cause the communication unit 220 to transmit the type of an application currently being executed and status information of the application (e.g., game progress information) to the server 10. As described below, with this operation, the positional information and the directional information of each user, the type of the application being executed, and the status information of the application can be shared by the users.

{2-1-6. Communication Unit 220}

The communication unit 220 transmits and receives information to and from other apparatuses via the communication network 22, for example. The communication unit 220 receives control information for starting and ending display of the AR object from the server 10, for example.

{2-1-7. Input Unit 224}

The input unit 224 receives various kinds of input by a user. The input unit 224 includes a touch panel, a button, a switch, or a lever, for example.

{2-1-8. Output Unit 226}

The output unit 226 outputs various kinds of information (videos and/or voices or the like) in accordance with control of the output controller 204. The output unit 226 includes a transmissive display apparatus (e.g., a projector) or a non-transmissive display apparatus (e.g., a liquid crystal display (LCD)), or an organic light emitting diode (OLED), for example. In the former, the output unit 226 can project videos in accordance with control of the output controller 204 with at least partial area of each of a right-eye lens and a left-eye lens (or a goggles type lens) included in the eyewear 20 as a projection plane. In the latter, the output unit 226 can successively display videos ahead of the server 10 being taken by the outward camera of the sensor 222 in accordance with control of the output controller 204.

Further, the output unit 226 can have a voice output unit. The voice output unit includes a speaker, earphones, or headphones, for example. The voice output unit outputs voices in accordance with control of the output controller 204.

{2-1-9. Storage Unit 228}

The storage unit 228 stores therein various kinds of data and various kinds of software.

2-2. Configuration: Server 10

Figure 3:
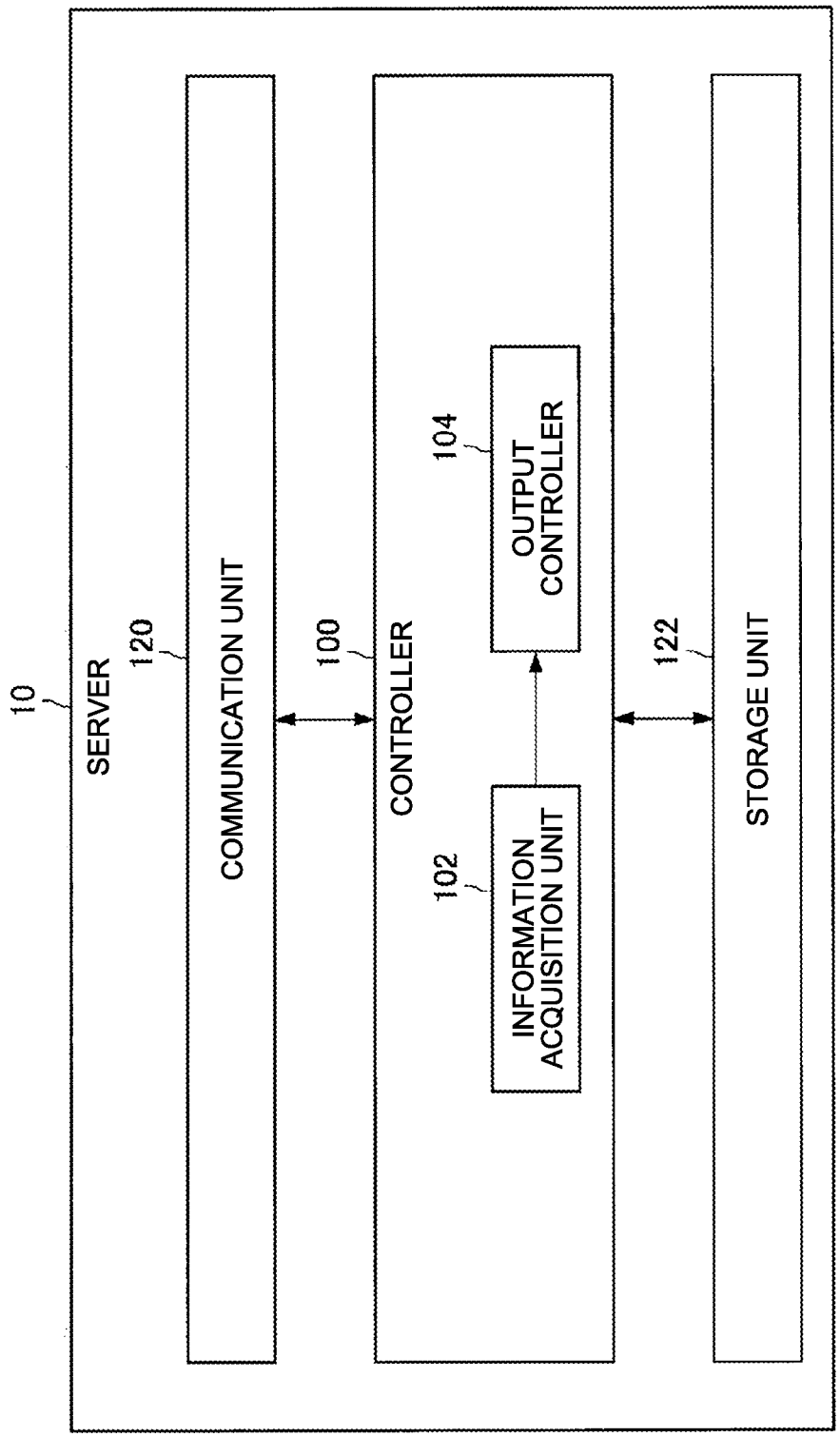
FIG. 3 is a functional block diagram of a configuration example of a server 10 according to the first embodiment.

The following describes a configuration of the server 10 according to the first embodiment with reference to FIG. 3. FIG. 3 is a functional block diagram of a configuration example of the server 10 according to the first embodiment. As illustrated in FIG. 3, the server 10 has a controller 100, a communication unit 120, and a storage unit 122.

{2-2-1. Controller 100}

The controller 100 can include a processing circuit such as a CPU 150 described below or a GPU, for example. The controller 100 comprehensively controls operation of the server 10. As illustrated in FIG. 3, the controller 100 has an information acquisition unit 102 and an output controller 104.

{2-2-2. Information Acquisition Unit 102}

The information acquisition unit 102 acquires information received by the communication unit 120 from external apparatuses (the eyewear 20 or the like) by performing reception, reading processing, or the like, for example. The information acquisition unit 102 acquires the positional information and the directional information of each of the users by receiving them from the eyewear 20 worn by each of the users, for example.

Further, the information acquisition unit 102 can acquire positional information of each of a plurality of places with which the AR object is associated from the storage unit 122 described below, for example. Alternatively, the information acquisition unit 102 may acquire the positional information of each of the places with which the AR object is associated by inquiring of an external storage apparatus (not illustrated).

{2-2-3. Output Controller 104}

The output controller 104 controls information output by one or more pieces of eyewear 20 based on the information acquired by the information acquisition unit 102. The output controller 104, based on positional information of any place with which a certain AR object is associated and positional information and directional information of one or more users acquired by the information acquisition unit 102, may switch between on and off of display of the AR object (e.g., the start and end of videos) by each of the pieces of eyewear 20 worn by the one or more users, switch between the startup and end of an application, switch between on and off of output of voices and music, or switch the status information of the application, for example. When the type of the application is a game, for example, the output controller 104 may switch events, scenes, and the like or add or change rules of the game.

As an example, the output controller 104, based on the positional information of any place with which the certain AR object is associated and the positional information and the directional information of the one or more users acquired by the information acquisition unit 102, changes an output state of the AR object by the eyewear 20 worn by each of the one or more users from a first state to a second state, which is different from the first state. The first state can be either a state in which the AR object is being output or a state in which the AR object is not being output. The second state can be another of the two states.

Figure 4:
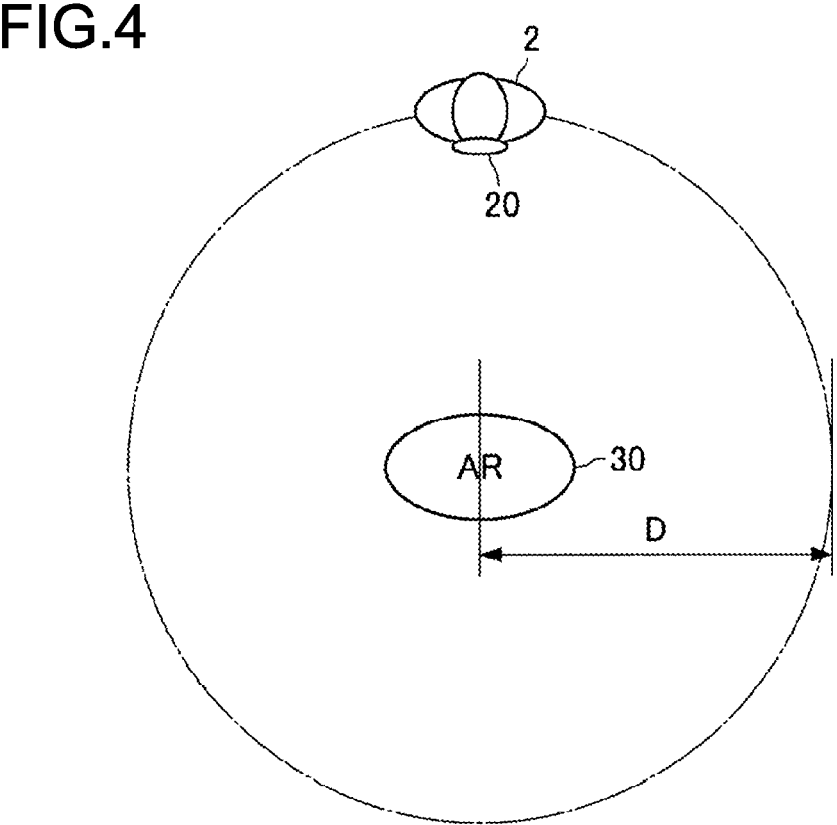
FIG. 4 is a diagram of an example in which output of an AR object is started based on the distance between a place with which the AR object is associated and a user.

The following describes the above function in more detail with reference to FIG. 4. As illustrated in FIG. 4, it is assumed that the distance between a place 30 with which a certain AR object is associated and a user 2 has become smaller than a certain distance D, for example. In this case, the output controller 104 may start output of the AR object (associated with the place 30) to the eyewear 20 worn by the user 2. Output of the AR object can include displaying the AR object. Further, output of the AR object may include outputting a voice corresponding to the AR object, lighting up a certain light emitting diode (LED) included in the eyewear 20, making a real object within the real space positioned around the eyewear 20 luminous, for example, or moving the real object with a certain motion pattern.

(2-2-3-1. Number of Users)

Alternatively, the output controller 104 can also change the output state of the AR object by the eyewear 20 worn by each of the users from the first state to the second state in a certain time based on the positional information of any place with which the AR object is associated, the positional information and the directional information of each of the users, and the number of the users. That is to say, the output controller 104 can synchronize the output states of the AR object by the pieces of eyewear 20 worn by the respective users with each other in the certain time. The output controller 104 changes the output state of the AR object by the eyewear 20 worn by each of the users from the first state to the second state in the certain time based on, for each of the users, whether a direction indicated by the directional information of the user based on the positional information of the user falls within a certain range of the place with which the AR object is associated, whether the distance between the positional information of the place and the positional information of the user is within a certain distance range, and whether the number of the users is within a certain number range, for example.

As an example, only when the number of the users is within the certain number range, for each of the users, the direction indicated by the directional information of the user based on the positional information of the user falls within a certain range of one place with which the AR object is associated (e.g., the place is contained within the angle of view of the user), and the distance between the positional information of the place and the positional information of the user has been within the certain distance range, the output controller 104 changes the output state of the AR object by the eyewear 20 worn by each of the users from the first state to the second state in the certain time. While the number of the users is out of the certain number range, the output controller 104 can maintain the output state of the AR object by the eyewear 20 worn by each of the users at the first state.

In this case, the output controller 104 may cause the eyewear 20 worn by at least one among the users or an output apparatus (a projector or the like) within an environment in which the users are positioned to output notification information for providing notification of a difference between an upper limit or a lower limit of the certain number range and a current number of the users. The output controller 104 may change the notification information in accordance with the difference between the upper limit or the lower limit of the certain number range and the current number of the users, for example. As an example, the output controller 104 may, as the difference becomes smaller, increase the value of a display parameter (luminance or the like) of an image (light or the like) being displayed on the eyewear 20 worn by each of the users, change the type of the image being displayed on the eyewear 20, increase the value of a parameter of a sound (volume or the like) being output by the eyewear 20 worn by each of the users, or change the type of the sound being output by the eyewear 20. With these control examples, a user positioned near the position with which the AR object is associated can be notified of how many users are required to be gathered in order to start display of the corresponding AR object.

The certain number range may be set for each place with which the AR object is associated, be set for each application, be set for each status information of the application (e.g., the progress of a game), or be set for each environmental information (e.g., date and time, weather, or region).

Figure 5:
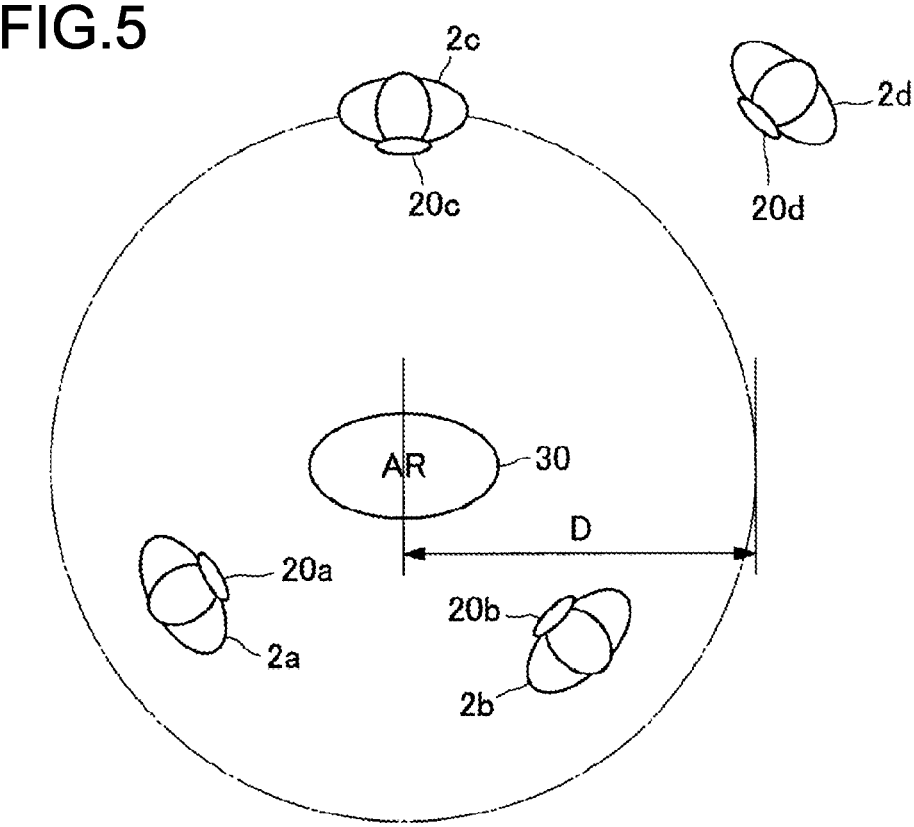
FIG. 5 is a diagram of an example in which output of the AR object is started based on the distance between the place with which the AR object is associated and each of a plurality of users.

The following describes the function of the output controller 104 in more detail with reference to FIG. 5. The example illustrated in FIG. 5 is based on the premise that it is not until when the distance between the place 30 with which the certain AR object is associated and each of three users has become smaller than the certain distance "D" and a direction indicated by directional information of each of the three users has fallen within a certain range of the place 30 that display of the AR object is stared. As illustrated in FIG. 5, it is assumed that the distance between the place 30 and each of the three users (users 2a, 2b, and 2c) has become smaller than "D" and the direction indicated by the directional information of the user based on the positional information of each of the three users has fallen within the certain range of the place 30. (It is assumed that the place 30 is contained within the angle of view of the eyewear 20 worn by each user, for example.) In this case, the output controller 104 may cause the eyewear 20 worn by each of the three users to start output of the AR object (associated with the place 30).

For each place 30 with which the AR object is associated, the number of users positioned within the certain range of the place 30 required to change the output state of the AR object (e.g., the start and end of display) can be set in advance. Alternatively, "the number of users positioned within the certain range of the place 30 required to change the output state of the AR object" may be set for each application or be set for each status of the application (e.g., the progress of a game).

(2-2-3-2. Arrangement Shape)

Alternatively, the output controller 104 can also change the output state of the AR object by the eyewear 20 worn by each of the users from the first state to the second state in the certain time based on the positional information of any place with which the AR object is associated, the positional information and the directional information of each of the users, and an arrangement shape (positional relation) determined based on the positional information of each of the users. Only when, for each of the users, the direction indicated by the directional information of the user based on the positional information of the user falls within a certain range of one place with which the AR object is associated, the distance between the positional information of the place and the positional information of the user is within a certain distance range, and the arrangement shape of the users has become a certain shape, the output controller 104 may change the output state of the AR object by the eyewear 20 worn by each of the users from the first state to the second state in the certain time, for example. While the arrangement shape of the users is not the certain shape, the output controller 104 may maintain the output state of the AR object by the eyewear 20 worn by each of the users at the first state.

The arrangement shape may be a two-dimensional shape (e.g., a straight line, a circle, a triangle, or a rectangle) determined based on the positional information of each of the users or a three-dimensional shape (e.g., a sphere, a rectangular parallelepiped, or a triangular pyramid) determined based on the positional information and height information of each of the users. For the certain arrangement shape, separate shapes may be set for each place with which the AR object is associated, separate shapes may be set for each application, separate shapes may be set for each status of the application (e.g., the progress of a game), or separate shapes may be set for each environmental information (e.g., date and time, weather, or region).

Figure 6:
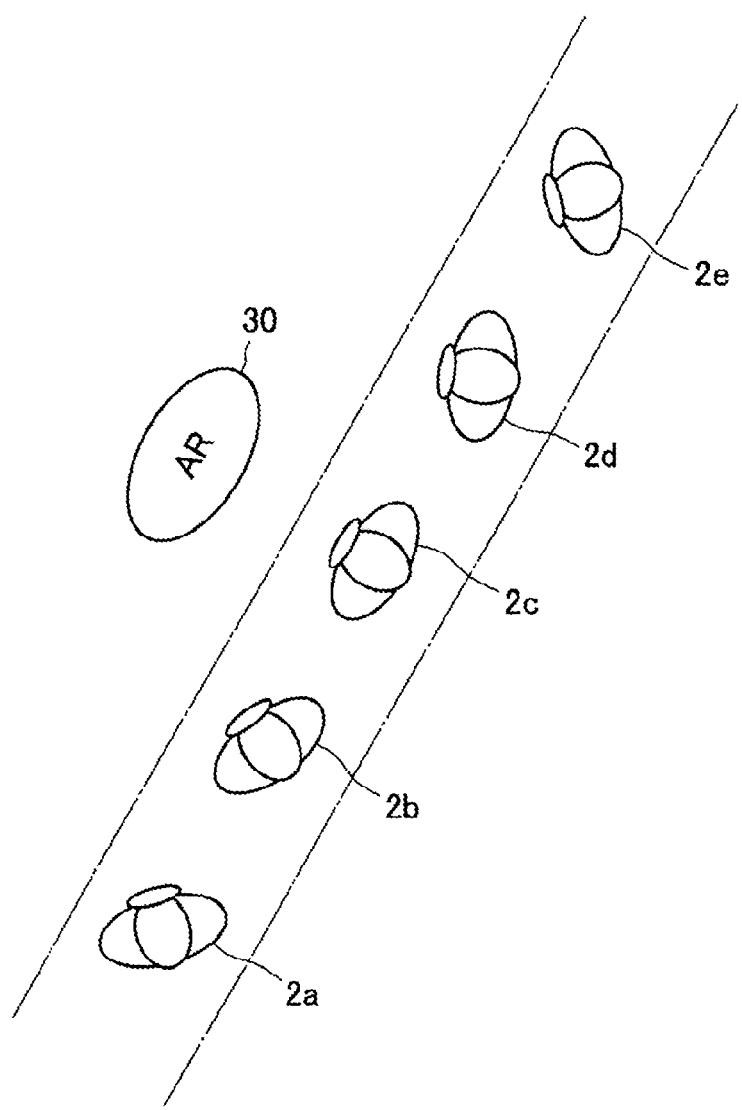
FIG. 6 is a diagram of an example in which output of the AR object is started on the condition that an arrangement shape of the users is a straight line.
Figure 7:
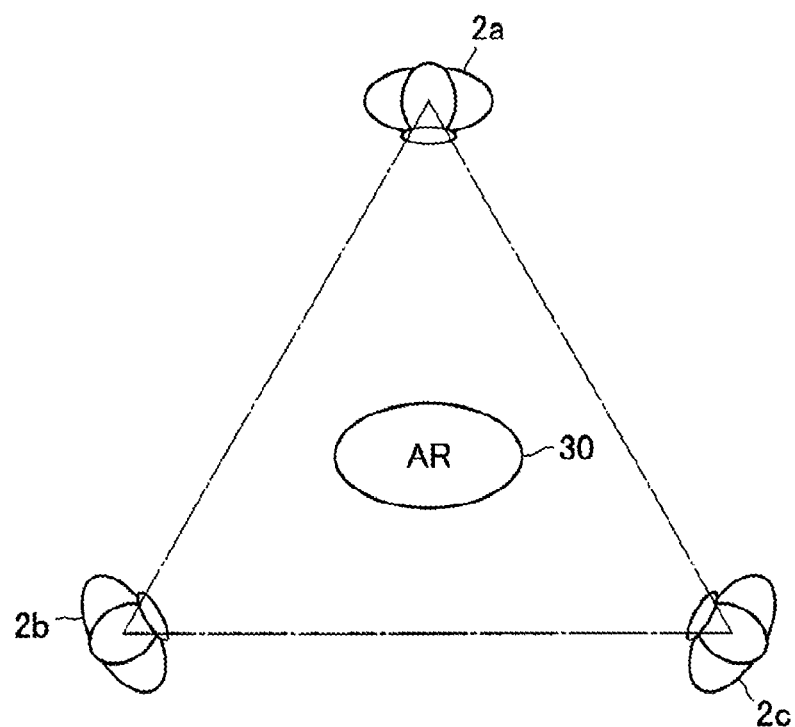
FIG. 7 is a diagram of an example in which output of the AR object is started on the condition that the arrangement shape of the users is a triangle.

The following describes the function of the output controller 104 in more detail with reference to FIG. 6 and FIG. 7. FIG. 6 is a diagram of an example in which only when the positions of a plurality of users 2 facing the place 30 with which the AR object is associated are linearly approximated, display of the AR object by the eyewear 20 worn by each of the users 2 is started. Display of the AR object can be started in a scene in which the users form a line or walk side-by-side, for example.

As illustrated in FIG. 6, it is assumed that it is determined that the place 30 is contained within the angle of view of each of five users 2 and the arrangement shape of the five users 2 is a straight line. In this case, the output controller 104 may cause all the pieces of eyewear 20 worn by the respective five users 2 to start display of the AR object associated with the place 30.

FIG. 7 is a diagram of an example in which only when the arrangement shape of the users 2 facing the place 30 with which the AR object is associated is a triangle, display of the AR object by the eyewear 20 worn by each of the users 2 is started. As illustrated in FIG. 7, it is assumed that it is determined that the place 30 is contained within the angle of view of each of the three users 2 and the arrangement shape of the three users 2 is a triangle. In this case, the output controller 104 may cause all the pieces of eyewear 20 worn by the respective three users 2 to start display of the AR object associated with the place 30.

Alternatively, the output controller 104 can also change the output state of the AR object by the eyewear 20 worn by each of the users from the first state to the second state in the certain time based on a three-dimensional arrangement shape (positional relation) determined based on the positional information and the height information of each of the users. As described above, the height information can be acquired by estimating the self-position by the eyewear 20 worn by each user. Alternatively, a certain marker may be attached to the place with which the AR object is associated or the neighborhood of the place, and the marker may be read by the eyewear 20. In this case, the height information may be acquired by causing the height information of the user wearing the eyewear 20 to be calculated based on a sensing result of the attitude of the eyewear 20 when the eyewear 20 reads the marker.

Figure 8:
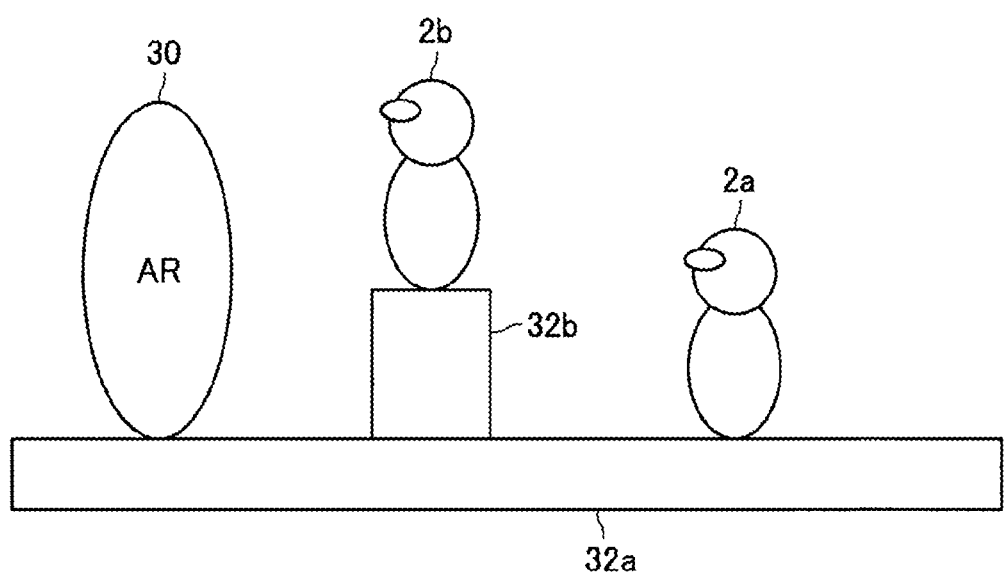
FIG. 8 is a diagram of an example in which output of the AR object is started on the condition that the arrangement shape of the users is a certain three-dimensional shape.

The following describes the function of the output controller 104 in more detail with reference to FIG. 8. FIG. 8 is a diagram of an example in which only when the arrangement shape of the users 2 facing the place 30 with which the AR object is associated has become a certain three-dimensional shape, display of the AR object by the eyewear 20 worn by each of the users 2 is started. As illustrated in FIG. 8, it is assumed that a user 2a faces the place 30 standing on a floor 32a and a user 2b faces the place 30 standing on an object 32b (placed on the floor 32a). In this case, the output controller 104 determines that the arrangement shape of the two users 2 has become the certain three-dimensional shape and may cause the eyewear 20 worn by each of the two users 2 to start display of the AR object associated with the place 30. Display of the AR object is started when the arrangement shape of the users has become the certain shape like these control examples, whereby one or more of the users can be avoided from overlooking or losing sight of the AR object.

(2-2-3-3. Positional Relation Between User and Real Object)

Alternatively, the output controller 104 can also change the output state of the AR object by the eyewear 20 worn by each of the users from the first state to the second state in the certain time based on the relation among the positional information of the place with which the AR object is associated, the positional information of each of the users, and positional information of a certain real object (e.g., a real object related to the place).

Figure 9:
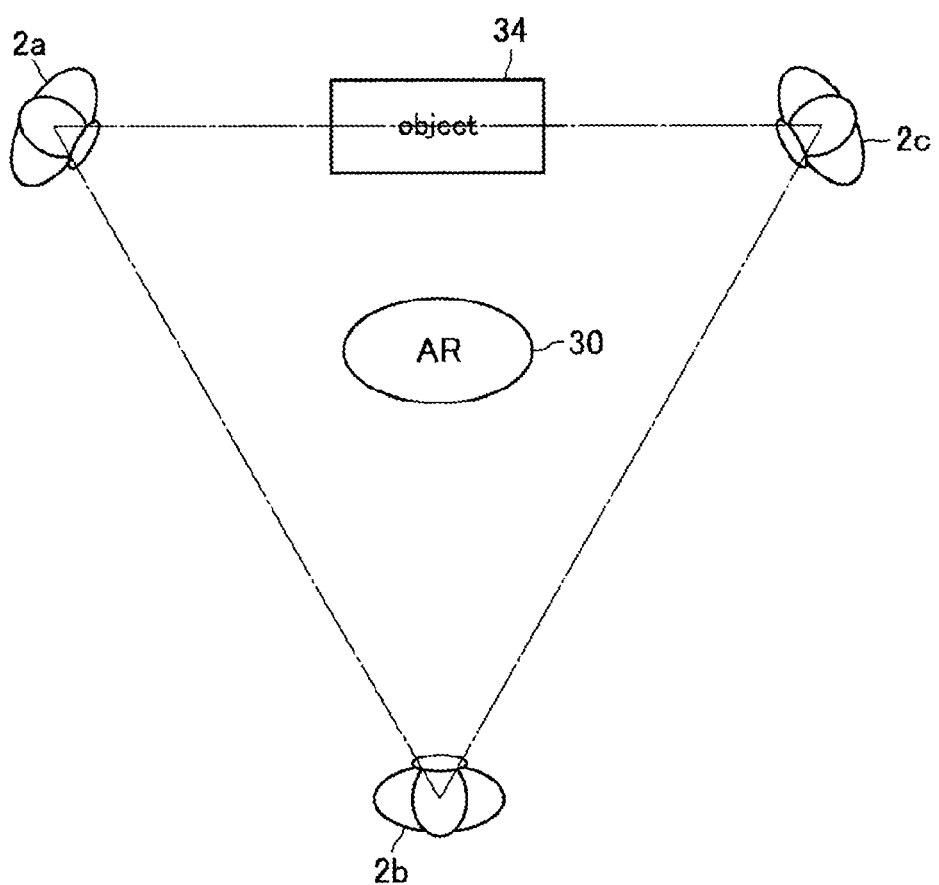
FIG. 9 is a diagram of an example in which output of the AR object is started on the condition that the positional relation between the users and a certain real object is a certain positional relation.

The following describes the above function in more detail with reference to FIG. 9. As illustrated in FIG. 9, it is assumed that the users 2 are positioned within a certain range of the place 30 with which the AR object is associated and the users 2 face the place 30, for example. Further, it is assumed that the three users are positioned with a positional relation with the user 2b facing a certain object 34 and with the residual two users (the users 2a and 2c) interposing the object 34 therebetween. In this case, the output controller 104 determines that the three users 2 and the object 34 have become a certain positional relation and may cause all the pieces of eyewear 20 worn by the respective three users 2 to start display of the AR object associated with the place 30.

(2-2-3-4. Modification)

As a modification, the output controller 104 may, before display of the AR object is started, cause the eyewear 20 worn by at least one among the users to display notification information for providing notification of the arrangement shape of the users required to start display of the AR object. Alternatively, the output controller 104 may cause a display apparatus within an environment in which the users are positioned to display the notification information.

Figure 10A:
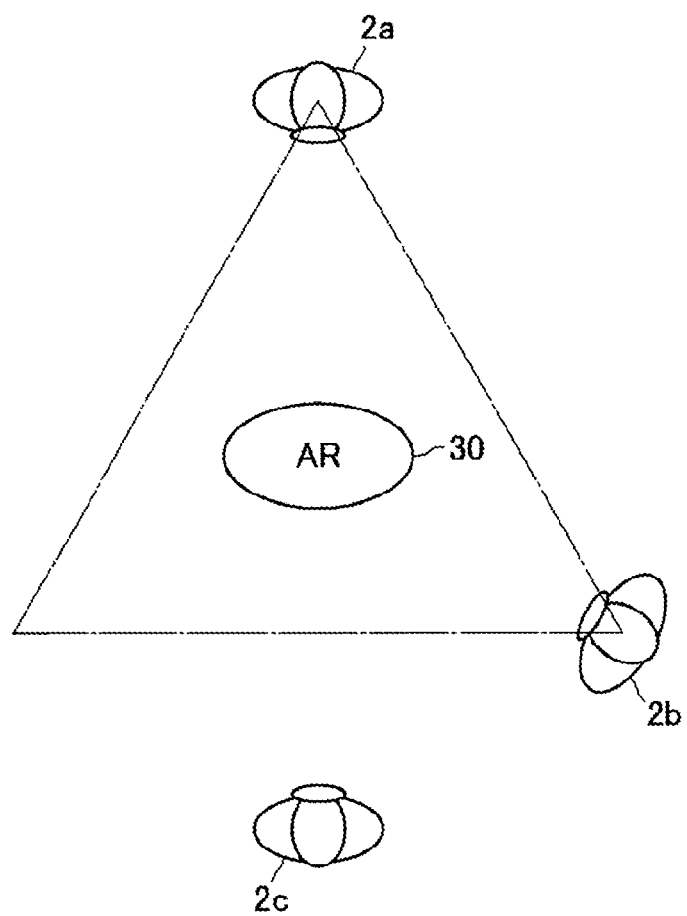
FIG. 10A is a diagram of a situation in which a user 2c is positioned outside the triangle when the condition illustrated in FIG. 7 is set.
Figure 10B:
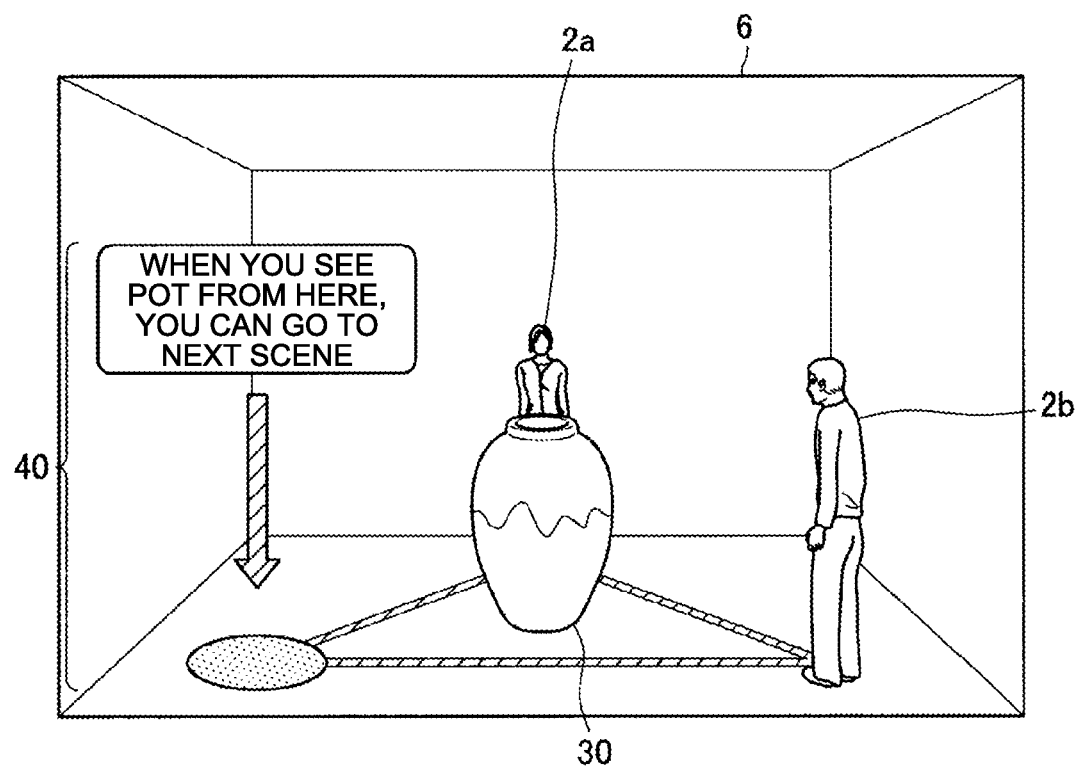
FIG. 10B is a diagram of a display example of notification information by eyewear 20 worn by the user 2c in the situation illustrated in FIG. 10A.

The following describes the above function in more detail with reference to FIG. 10A and FIG. 10B. The example illustrated in FIG. 10A and FIG. 10B illustrates an example in which only when the arrangement shape of the users has become a triangle centered on the place 30, display of the AR object associated with the place 30 is started. As illustrated in FIG. 10A, it is now assumed that the user 2a and the user 2b are standing at positions corresponding to two apexes of the triangle and the user 2c is positioned outside the triangle. In this case, as illustrated in FIG. 10B, the output controller 104 may cause the eyewear 20 worn by the user 2c to display notification information 40 indicating a position at which the user 2c should stand in order to start display of the AR object. With this operation, the user 2c can be notified of what positional relation among the users starts display of the corresponding AR object.

{2-2-4. Communication Unit 120}

The communication unit 120 can include a communication apparatus 162 described below. The communication unit 120 transmits and receives information to and from other apparatuses via the communication network 22, for example. The communication unit 120 receives the positional information and the directional information of a user from the eyewear 20 worn by the user, for example. The communication unit 120 transmits, to the eyewear 20 worn by each of the users, control information for changing the output state of the AR object by the eyewear 20 in accordance with control of the output controller 104.

{2-2-5. Storage Unit 122}

The storage unit 122 can include a storage apparatus 160 described below. The storage unit 122 stores therein various kinds of data and various kinds of software. The storage unit 122, for each place with which the AR object is associated, stores therein the positional information of the place, the type of the AR object, rules for switching between on and off of output of the AR object, and the like in association with each other, for example.

2-3. Processing Procedure

The configuration of the first embodiment has been described. The following describes an exemplary processing procedure according to the first embodiment with reference to FIG. 11.

Figure 11:
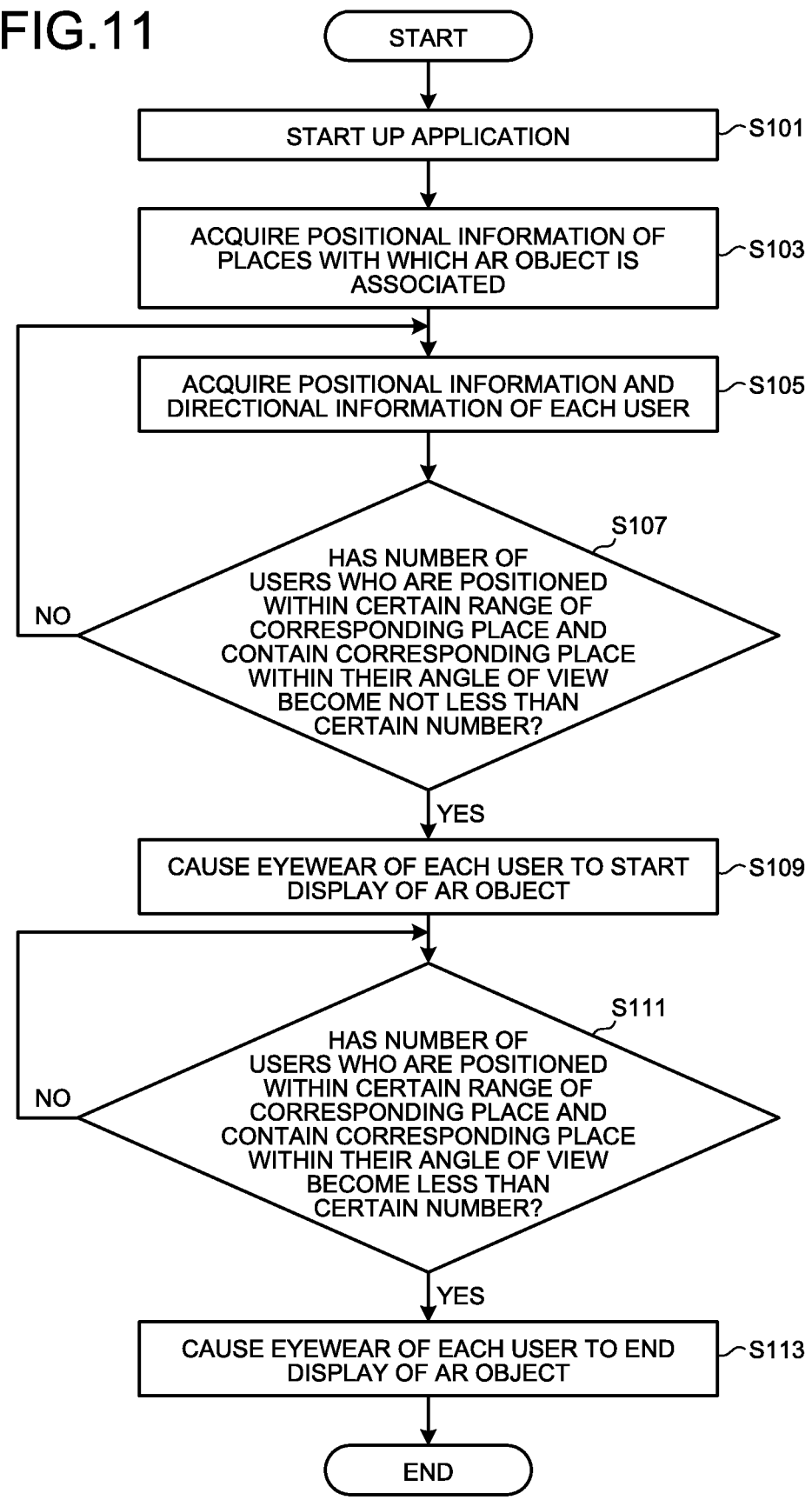
FIG. 11 is a flowchart of a processing procedure according to the first embodiment.

As illustrated in FIG. 11, first, the eyewear 20 worn by each of the users starts up a certain application (e.g., a game application) based on operation by the users. The pieces of eyewear 20 notify the server 10 of the startup of the application (S101).

Subsequently, the information acquisition unit 102 of the server 10 acquires the positional information of individual places with which the AR object is associated stored in the storage unit 122, for example (S103).

Subsequently, the communication unit 220 of the eyewear 20 worn by each of the users successively transmits the positional information and the directional information of the eyewear 20 sensed by the sensor 222 to the server 10 in accordance with control of the controller 200 (S105).

Subsequently, the output controller 104 of the server 10 calculates the number of users who are positioned within a certain range of any place with which the AR object is associated acquired at S103 and contain the place within their angle of view. If the calculated number is less than a certain number (No at S107), the processing at S105 and the subsequent step will be performed again.

In contrast, if the calculated number is not less than the certain number (Yes at S107), the output controller 104 of the server 10 switches a display state of the AR object associated with the corresponding place by the eyewear 20 worn by each of the users from off (a non-displaying state) to on (a displaying state) in a certain time. That is to say, the output controller 104 causes the eyewear 20 worn by each of the users to start display of the corresponding AR object in the certain time (S109).

Subsequently, the output controller 104 again calculates the number of users who are positioned within the certain range of the corresponding place and contain the place within their angle of view. If the calculated number is not less than the certain number (No at S111), the server 10 again performs the processing at S111.

In contrast, if the calculated number has become less than the certain number (Yes at S111), the output controller 104 switches the display state of the corresponding AR object by the eyewear 20 worn by each of the users from on to off in the certain time. That is to say, the output controller 104 causes the eyewear 20 worn by each of the users to end display of the corresponding AR object in the certain time (S113).

2-4. Effects

As described above, the server 10 according to the first embodiment acquires the positional information of the first place with which the AR object is associated and the positional information and the directional information of each of the users and controls output of the AR object by the eyewear 20 worn by each of the users based on the positional information of the first place and the positional information and the directional information of each of the users. With this operation, sharing of the AR object by the users can be assisted. The users each wearing the eyewear 20 can share the AR object automatically and easily, for example.

The server 10 can switch the output state of the AR object by the eyewear 20 worn by each user from the first state to the second state in the certain time based on the relation between the positional information of the first place and the positional information of each user and the relation between the directional information of each user based on the positional information of each user and the first place, for example. Consequently, display of the AR object can be controlled at the same timing for all the users. Only any one or more users can be avoided from overlooking or losing sight of the AR object, for example. In addition, the same AR object can simultaneously be presented to all the users.

3. Second Embodiment

The first embodiment has been described. By the way, in a scene in which users act by group, it is desirable to be able to, in accordance with the state of a certain group, show another group movement timing and a movement destination.

The following describes a second embodiment. As described below, the second embodiment can, adaptively to the state of a certain group, guide another group to move to another place.

The second embodiment assumes a scene in which a plurality of groups are present. A plurality of users belong to the certain group, and one or more users can belong to the other group. That is to say, the number of users belonging to the group may be one. The second embodiment can set groups in the following way. All users who have read a certain AR marker using the eyewear 20 in a certain period may be set as one group, for example. Alternatively, area division is performed by position estimation, whereby, for each divided area, all one or more users positioned within the area may each be set as one group. Alternatively, group information may be set in the eyewear 20 in advance. Alternatively, groups may be set or changed in real time based on a certain operation by one user.

3-1. Configuration

A configuration of the eyewear 20 according to the second embodiment is similar to that of the first embodiment. Components included in the server 10 according to the second embodiment are the same as those of the first embodiment. The following describes only components having functions different from those of the first embodiment.

{3-1-1. Output Controller 104}

(3-1-1-1. Information Output to Preceding Group)

The output controller 104 according to the second embodiment controls information output by the eyewear 20 worn by each of a plurality of users belonging to a first group sharing a first AR object based on a certain condition. The certain condition may be a lapse of a certain time from the start of the presentation of the first AR object to the users belonging to the first group. Alternatively, when the application is a game, the certain condition may be clearing an event corresponding to the first AR object by the users (e.g., defeating an enemy character). Alternatively, the certain condition may be detection of the approach of a plurality of users belonging to another group (the second group) near a place with which a second AR object is associated. Alternatively, the certain condition may be a lapse of a certain time from the start of output of the second AR object by the eyewear 20 worn by each of the users belonging to the other group.

The output controller 104 changes an output state of the first AR object by the eyewear 20 worn by each of the users belonging to the first group in a certain time based on positional information of a second place with which the second AR object is associated and positional information and directional information of each of the users belonging to the second group, for example. As an example, when it is detected that each of the users belonging to the second group is positioned within a certain range of the second place and faces the second place, the output controller 104 may cause the eyewear 20 worn by each of the users belonging to the first group to end display of the first AR object in the certain time. Alternatively, in this case, the output controller 104 may gradually shift a display position of the first AR object in the eyewear 20 worn by each of the users belonging to the first group in a direction prompting the users to move. With this operation, the users belonging to the first group can be guided to move to another place.

Alternatively, the output controller 104 can also cause the eyewear 20 worn by each of the users belonging to the first group to output guidance information for guiding them to leave the first place based on the positional information of the second place with which the second AR object is associated and positional information and directional information of each of a plurality of second users belonging to the second group. Output of the guidance information may be display of a video prompting guidance (e.g., an arrow image), output of a voice prompting guidance (e.g., a voice saying "Please move to the next area."), or generation of vibrations by a device worn by the users (the eyewear 20 or the like), for example.

The output controller 104 causes the eyewear 20 worn by each of the users belonging to the first group to output the guidance information by stages, for example. As an example, the output controller 104 first causes the eyewear 20 worn by each of the users belonging to the first group to display an arrow image. When a first time has elapsed while the users remain not to move, the output controller 104 causes the eyewear 20 worn by each of the users to output a voice prompting guidance. Further, when a second time has elapsed while the users remain not to move, the output controller 104 gradually shifts the display position of the first AR object being displayed on the eyewear 20 worn by each of the users in the direction prompting the users to move.

(3-1-1-2. Information Output to Following Group)

Further, the output controller 104 can also cause the eyewear 20 worn by each of the users belonging to the second group to output guidance information for prompting movement to the first place based on positional information of the first place with which the first AR object is associated and positional information and directional information of each of the users belonging to the first group who shared the first AR object. Output of the guidance information may be display of a video prompting guidance (e.g., an arrow image), output of a voice prompting guidance (e.g., a voice saying "Please move to the next area."), generation of vibrations by a device worn by the users (the eyewear 20 or the like), or the like, for example.

Figure 12B:
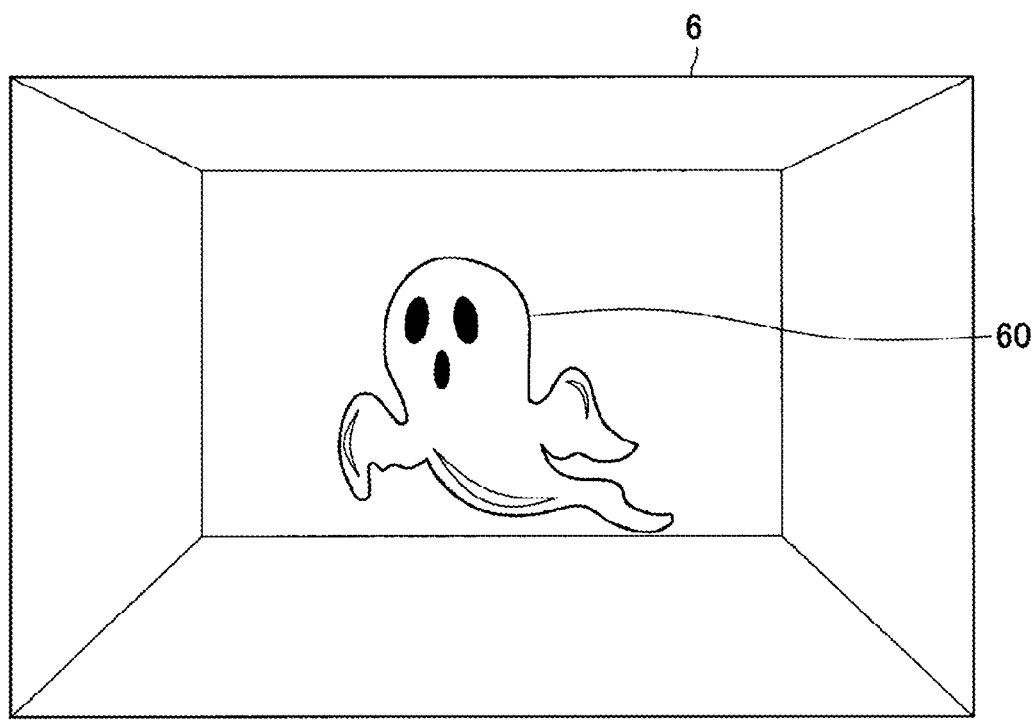
FIG. 12B is a diagram of a display example of the AR object by the eyewear 20 worn by a plurality of users belonging to a second group in the situation illustrated in FIG. 12A.
Figure 12C:
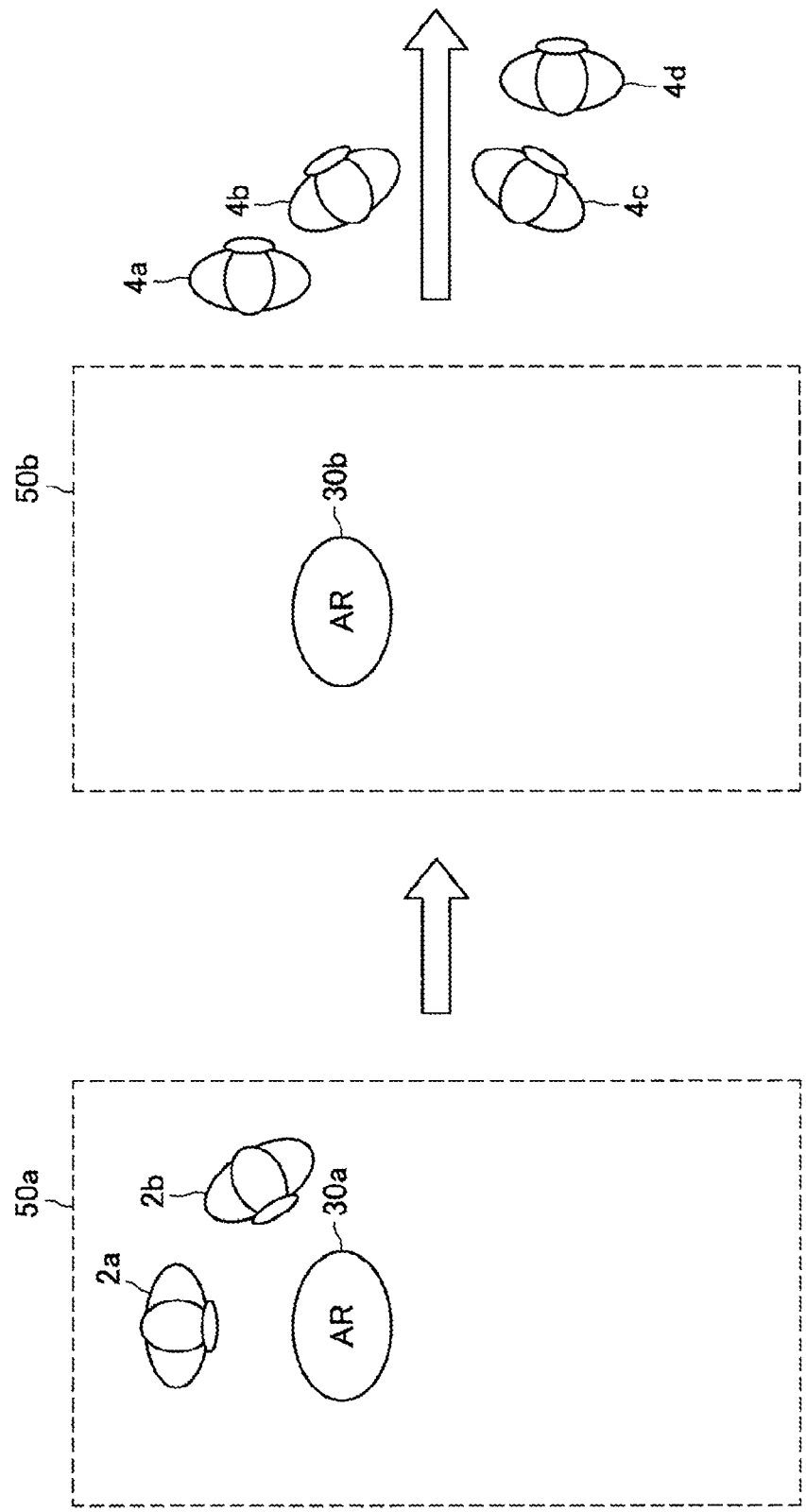
FIG. 12C is a diagram of illustrating how all the users belonging to a first group have left the area 50b.
Figure 12D:
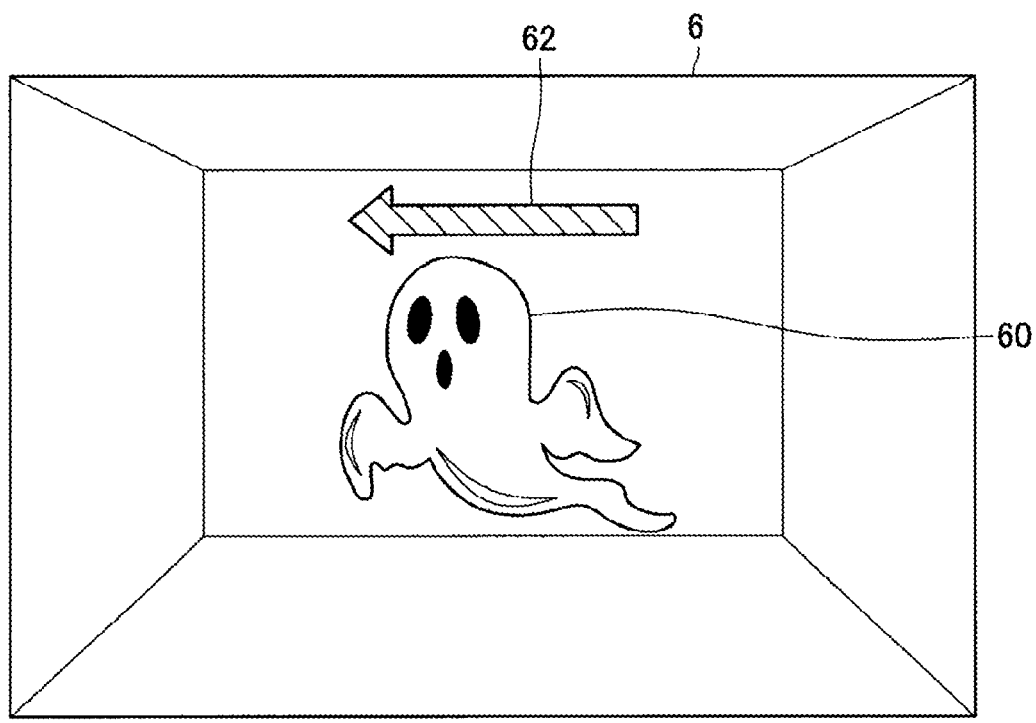
FIG. 12D is a diagram of a display example of guidance information for the users belonging to the second group in the situation illustrated in FIG. 12C.

The following describes the above function in more detail with reference to FIG. 12A to FIG. 12D. FIG. 12A illustrates an example in which a plurality of users 4 belonging to the first group are positioned within an area 50b, and a plurality of users 2 belonging to the second group are positioned within an area 50a. It is assumed that it is detected that the users 2 (belonging to the second group) have approached a place 30a with which the first AR object is associated at a point in time illustrated in FIG. 12A. In this case, as illustrated in FIG. 12B, for example, the output controller 104 causes the eyewear 20 worn by each of the users 2 to start output of an AR object 60 (a ghost 60). Further, the output controller 104 causes the eyewear 20 worn by each of the users 4 (belonging to the first group) to output guidance information for guiding them to leave the area 50b. Subsequently, as illustrated in FIG. 12C, it is assumed that it is detected that all the users 4 belonging to the first group have left the area 50b. In this case, as illustrated in FIG. 12D, for example, the output controller 104 may cause the eyewear 20 worn by each of the users 2 to display an arrow image 62 for prompting movement from the area 50a to the area 50b. Additionally or alternatively, the output controller 104 may gradually move a display position of the AR object 60 being displayed on the eyewear 20 worn by each of the users 2 toward the area 50b. This control example, when a plurality of groups are using an event application in which users enjoy AR objects while moving through a plurality of areas, can guide individual groups to move to each of the areas at appropriate timing, for example.

3-2. Processing Procedure

The configuration of the second embodiment has been described. The following describes an exemplary processing procedure according to the second embodiment with reference to FIG. 13. It is assumed that the users belonging to the first group are positioned within an area A, and the users belonging to the second group are positioned within an area B. Further, it is assumed that a condition for starting display of an AR object associated with a certain place within the area A for the users within the area A is satisfied in advance.

As illustrated in FIG. 13, first, the output controller 104 of the server 10 causes the eyewear 20 worn by the users belonging to the first group to display the AR object associated with the certain place within the area A (S201).

Subsequently, the output controller 104 determines whether a certain time has elapsed from the start of display of the AR object within the area A (S203). If the certain time has not elapsed from the start of display of the AR object (No at S203), the output controller 104 again performs the processing at S201 and the subsequent step.

In contrast, if the certain time has elapsed from the start of display of the AR object (Yes at S203), the output controller 104 causes the eyewear 20 worn by the users belonging to the first group to end display of the AR object (S205).

Subsequently, the output controller 104 causes the eyewear 20 worn by the users belonging to the second group to display guidance information for prompting movement from the area B to the area A (S207).

3-3. Effects

As described above, the server 10 according to the second embodiment acquires the positional information of the first place with which the AR object is associated and the positional information and the directional information of each of the users belonging to the first group and causes the eyewear 20 worn by each of the users belonging to the second group to output the guidance information for prompting movement to the first place based on the positional information of the first place and the positional information and the directional information of each of the users belonging to the first group. With this operation, the second group can be guided to move to the first place adaptively to the state of the first group. When the users belonging to the first group have left the first place, for example, the server 10 can guide the users belonging to the second group to move to the first place.

The second embodiment, when the AR object is shared by group, can control timing at which movement is prompted for each group in accordance with the situations of other groups.

4. Application Examples

The second embodiment has been described. The following describes application examples of the embodiments described above in "4-1. Application Example 1" to "4-5. Application Example 5."

4-1. Application Example 1

The following first describes Application Example 1. Application Example 1 assumes a scene in which a plurality of users wearing the eyewear 20 use an outdoor game application. In Application Example 1, the relation between the positional information of the place with which the AR object is associated and the positional information of each of the users can be used as a condition for switching scenes in the game being executed by the eyewear 20 worn by each of the users. When it is detected that the users have touched the place with which the AR object is associated with their hands, for example, the server 10 switches scenes in the game being executed by the eyewear 20 worn by each of the users. With this operation, one or more users can be avoided from being unable to determine that the scenes have been switched. Consequently, a game in which all the users pursue the movement of the same AR object can be achieved, for example.

Further, the server 10, as more users approach the place with which the AR object is associated, for example, may increase the display size of a certain object being displayed on the eyewear 20 worn by each of these users, increase the luminance of the certain object, or increase the volume of a certain sound being output by the eyewear 20. This operation can guide more users to approach the place with which the AR object is associated (that is, more users to share the AR object).

4-2. Application Example 2

The following describes Application Example 2. Application Example 2 assumes a scene in which a plurality of groups separately go sight-seeing. In this case, adjustment is demanded such that places visited by the respective groups in the same time slot do not overlap with each other. Given this situation, the server 10 can guide individual groups to move based on positional relation among the groups. When there are a plurality of tourist spots, for example, the server 10 successively identifies absolute positions of the groups. Next, the server 10 successively determines whether a plurality of groups are about to move to the same tourist spot. When the groups are about to move to the same tourist spot, the server 10 guides groups other than any one group among the groups to move to another tourist spot.

4-3. Application Example 3

The following describes Application Example 3. Application Example 3 assumes a scene in which a plurality of users do sports (running, cycling, or the like). The server 10 causes the eyewear 20 worn by each user to display introduction of a training menu, navigation, or the like when a certain number of users have gathered at one place. Further, the server 10 may successively change the contents of information displayed on the eyewear 20 worn by each user in accordance with positional relation among the users during the sports, for example.

4-4. Application Example 4

The following describes Application Example 4. Application Example 4 assumes a scene in which one or more users are in a house, and the one or more users wear the eyewear 20. In this case, the server 10 may switch the AR object (UI or the like) displayed on the eyewear 20 worn by each user in accordance with a place at which each user is in the house. Alternatively, the server 10 may, in accordance with the position of each user, change another user with whom the user shares the AR object. With this operation, a connection load can be reduced, or useless communication can be reduced.

When a user approaches the front door, the server 10 may display (project) the weather forecast for the current position near the door, for example. Alternatively, when a user approaches a TV set, the server 10 may cause the eyewear 20 worn by the user to display today's recommended programs. Alternatively, only when the distance between users has become small, the server 10 may start display (sharing) of the AR object on the eyewear 20 worn by these users or cause these users to share operations on some virtual object.

4-5. Application Example 5

The following describes Application Example 5. Application Example 5 is an example in which sharing of the AR object by a plurality of users is achieved in an office. The server 10 may control whether sharing of the AR object is permitted in accordance with the relation among the users, for example. Alternatively, the server 10 may automatically start or end a teleconference attended by the users based on conference schedule information. Further, the server 10 may cause information input by a certain user to be shared with another user sharing the AR object, for example. With this operation, a user can switch AR objects shared by the users or select another AR object as an object to be shared.

5. HARDWARE CONFIGURATION

Figure 14:
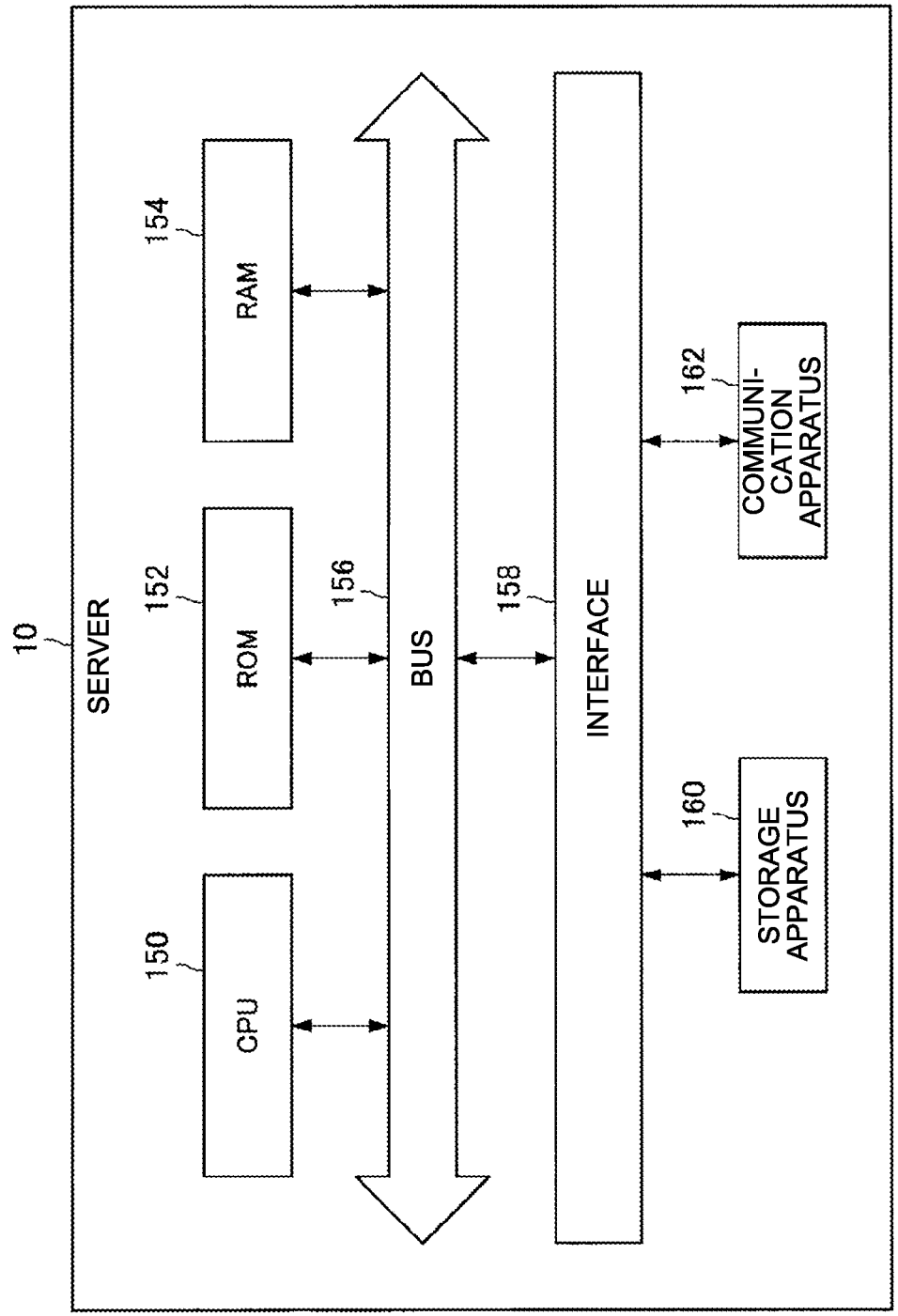
FIG. 14 is an illustrative diagram of a hardware configuration example of the server 10 common to the embodiments.

The following describes a hardware configuration example of the server 10 common to the embodiments with reference to FIG. 14. As illustrated in FIG. 14, the server 10 includes the CPU 150, a read only memory (ROM) 152, a random access memory (RAM) 154, a bus 156, an interface 158, the storage apparatus 160, and the communication apparatus 162.

The CPU 150 functions as an arithmetic processing unit and a control apparatus and controls all aspects of operation within the server 10 in accordance with various kinds of computer programs. The CPU 150 implements the functions of the controller 100 in the server 10. The CPU 150 includes a processor such as a microprocessor.

The ROM 152 stores therein computer programs and data for control such as arithmetic parameters used by the CPU 150.

The RAM 154 temporarily stores therein computer programs executed by the CPU 150, data being used, and the like, for example.

The bus 156 includes a CPU bus. This bus 156 interconnects the CPU 150, the ROM 152, and the RAM 154.

The interface 158 connects the storage apparatus 160 and the communication apparatus 162 to the bus 156.

The storage apparatus 160 is an apparatus for data storage functioning as the storage unit 122. The storage apparatus 160 includes a storage medium, a recording apparatus recording data in storage media, a reading apparatus reading data from storage media, or a deleting apparatus deleting data stored in storage media, for example.

The communication apparatus 162 is a communication interface including a communication device (e.g., a network card) for connecting to the communication network 22, for example. The communication apparatus 162 may be a wireless LAN-enabled communication apparatus, a long term evolution (LTE)-enabled communication apparatus, or a wired communication apparatus performing wired communication. This communication apparatus 162 functions as the communication unit 120.

6. MODIFICATIONS

The preferred embodiments of the present disclosure have been described in detail with reference to the accompanying drawings; the present disclosure is not limited to such examples. It is clear that those having common knowledge in the technical field to which the present disclosure belongs can think of various kinds of modifications or revisions within the scope of the technical ideas described in the claims, and it is understood that these also naturally belong to the technical scope of the present disclosure.

6-1. First Modification

The information processing system according to the embodiments described above shows an example including the server 10, for example; this is not limiting, and the server 10 is not necessarily included. In this case, any one of the pieces of eyewear 20 can execute the functions of the server 10 according to the embodiments described above (that is, the functions of the information acquisition unit 102 and the output controller 104 described above). That is to say, a master-slave system using the pieces of eyewear 20 may implement the embodiments described above. The eyewear 20 that has started up a certain application first, the eyewear 20 worn by a user who has approached the place with which the AR object is associated first, or the like may be set as a master, for example. The master may dynamically be switched among the pieces of eyewear 20.

6-2. Second Modification

The embodiments described above describe an example in which the eyewear 20 includes all the information acquisition unit 202, the output controller 204, and the transmission controller 206; this is not limiting. Any one or more of the information acquisition unit 202, the output controller 204, and the transmission controller 206 may be included in another portable terminal (e.g., a smartphone or a tablet terminal) communicable with the eyewear 20, and a user may carry the other portable terminal, for example.

6-3. Third Modification

As another modification, the first output unit of the present disclosure is not limited to the output unit 226 of the eyewear 20. The first output unit may be an output unit (a display unit, a voice output unit, or the like) of a portable terminal (e.g., a smartphone or a tablet terminal) carried by a user, for example. Further, when the portable terminal can implement all the functions of the eyewear 20 according to the embodiments described above, the eyewear 20 is not necessarily used.

6-4. Fourth Modification

FIG. 1 illustrates only one server 10; not limited to such an example, another modification may implement the functions of the server 10 according to the embodiment by causing a plurality of computers to cooperatively operate.

<6-5. Fifth Modification>

As another modification, the information processing apparatus according to the present disclosure is not limited to the server 10; the information processing apparatus may be another kind of apparatus having the information acquisition unit 102 and the output controller 104 described above. The information processing apparatus may be a general-purpose personal computer (PC), a tablet terminal, a game machine, a cellular phone such as a smartphone, a portable music player, a speaker, a projector, a wearable device such as a smart watch, a vehicle-mounted apparatus (a car navigation apparatus or the like), or a robot (e.g., a humanoid robot or a drone), for example.

6-6. Sixth Modification

The steps in the processing procedures of the embodiments described above are not necessarily processed in the described order. The steps may be processed with the order changed as appropriate, for example. Alternatively, the steps may be processed partially in parallel or individually instead of being processed on a time-series basis. Alternatively, part of the described steps may be omitted, or other steps may further be added.

The embodiments described above can also provide a computer program for exhibiting functions similar to the components of the server 10 according to the embodiments (the hardware such as the CPU 150, the ROM 152, and the RAM 154). A storage medium recording the computer program is also provided.

The effects described in the present specification are only illustrative or by way of example and are not limiting. That is to say, the technique according to the present disclosure can produce other effects obvious to those skilled in the art from the description of the present specification together with the above effects or in place of the above effects.

The following configurations also belong to the technical scope of the present disclosure.

(1)
An information processing apparatus comprising:
an information acquisition unit that acquires positional information of a first place with which first information is associated and positional information and directional information of each of a plurality of first users; and
an output controller that controls output of the first information by a first output unit carried by each of the first users based on the positional information of the first place and the positional information and the directional information of each of the first users.

(2)
The information processing apparatus according to (1), wherein
the first place is a place within a real space, and
the positional information of the first place and the positional information of each of the first users are each positional information within the real space.

(3)
The information processing apparatus according to (2), wherein the output controller changes an output state of the first information by the first output unit carried by each of the first users from a first state to a second state that is different from the first state, in a certain time based on the positional information of the first place and the positional information and the directional information of each of the first users.

(4)
The information processing apparatus according to (3), wherein the output controller changes the output state of the first information by the first output unit carried by each of the first users from the first state to the second state in the certain time based on whether, for each of the first users, a direction indicated by the directional information of the first user based on the positional information of the first user falls within a certain range of the first place and a distance between the positional information of the first place and the positional information of the first user.

(5)
The information processing apparatus according to (4), wherein
when, for each of the first users, the direction indicated by the directional information of the first user based on the positional information of the first user falls within the certain range of the first place, and the distance between the positional information of the first place and the positional information of the first user is within a distance range corresponding to the first place, the output controller changes the output state of the first information by the first output unit carried by each of the first users from the first state to the second state in the certain time,
the first state is either one of a state in which the first information is being output and a state in which the first information is not being output, and
the second state is another of the state in which the first information is being output and the state in which the first information is not being output.

(6)
The information processing apparatus according to (4) or (5), wherein the output controller changes the output state of the first information by the first output unit carried by each of the first users from the first state to the second state in the certain time further based on number of the first users.

(7)
The information processing apparatus according to (6), wherein
when the number of the first users is within a number range corresponding to the first place, the output controller changes the output state of the first information by the first output unit carried by each of the first users from the first state to the second state in the certain time based on whether, for each of the first users, the direction indicated by the directional information of the first user based on the positional information of the first user falls within the certain range of the first place and the distance between the positional information of the first place and the positional information of the first user,
while the number of the first users is out of the number range corresponding to the first place, the output controller maintains the output state of the first information by the first output unit carried by each of the first users at the first state,
the first state is either one of a state in which the first information is being output and a state in which the first information is not being output, and
the second state is another of the state in which the first information is being output and the state in which the first information is not being output.

(8)
The information processing apparatus according to (6) or (7), wherein
while the number of the first users is out of the number range corresponding to the first place, the output controller maintains the output state of the first information by the first output unit carried by each of the first users at the first state and causes the first output unit carried by at least one of the first users to output notification information for providing notification of a difference between an upper limit or a lower limit of the number range corresponding to the first place and a current number of the first users, the first state is either one of a state in which the first information is being output and a state in which the first information is not being output, and the second state is another of the state in which the first information is being output and the state in which the first information is not being output.

(9)

The information processing apparatus according to any one of (4) to (8), wherein the output controller changes the output state of the first information by the first output unit carried by each of the first users from the first state to the second state in the certain time further based on an arrangement shape determined based on the positional information of each of the first users.

(10)

The information processing apparatus according to (9), wherein when the arrangement shape determined based on the positional information of each of the first users becomes the same as an arrangement shape corresponding to the first place, the output controller changes the output state of the first information by the first output unit carried by each of the first users from the first state to the second state in the certain time based on whether, for each of the first users, the direction indicated by the directional information of the first user based on the positional information of the first user falls within the certain range of the first place and the distance between the positional information of the first place and the positional information of the first user, while the arrangement shape determined based on the positional information of each of the first users is different from the arrangement shape corresponding to the first place, the output controller maintains the output state of the first information by the first output unit carried by each of the first users at the first state, the first state is either one of a state in which the first information is being output and a state in which the first information is not being output, and the second state is another of the state in which the first information is being output and the state in which the first information is not being output.

(11)

The information processing apparatus according to (9) or (10), wherein while the arrangement shape determined based on the positional information of each of the first users is different from an arrangement shape corresponding to the first place, the output controller maintains the output state of the first information by the first output unit carried by each of the first users at the first state and causes the first output unit carried by at least one of the first users to output notification information for providing notification of the arrangement shape corresponding to the first place, the first state is either one of a state in which the first information is being output and a state in which the first information is not being output, and the second state is another of the state in which the first information is being output and the state in which the first information is not being output.

(12)

The information processing apparatus according to any one of (4) to (11), wherein the output controller changes the output state of the first information by the first output unit carried by each of the first users from the first state to the second state in the certain time further based on relation of height information of each of the first users.

(13)

The information processing apparatus according to (12), wherein the output controller changes the output state of the first information by the first output unit carried by each of the first users from the first state to the second state in the certain time based on a three-dimensional arrangement shape determined based on the positional information and height information of each of the first users, the first state is either one of a state in which the first information is being output and a state in which the first information is not being output, and the second state is another of the state in which the first information is being output and the state in which the first information is not being output.

(14)

The information processing apparatus according to any one of (4) to (13), wherein the output controller changes the output state of the first information by the first output unit carried by each of the first users from the first state to the second state in the certain time further based on relation among the positional information of the first place, the positional information of each of the first users, and positional information of a second object related to the first place within the real space, the first state is either one of a state in which the first information is being output and a state in which the first information is not being output, and the second state is another of the state in which the first information is being output and the state in which the first information is not being output.

(15)

The information processing apparatus according to any one of (4) to (14), wherein the first users belong to a first group, the output controller changes the output state of the first information by the first output unit carried by each of the first users from the first state to the second state in the certain time further based on positional information of a second place with which second information is associated within the real space and positional information and directional information of each of a plurality second users belonging to a second group, the first state is either one of a state in which the first information is being output and a state in which the first information is not being output, and the second state is another of the state in which the first information is being output and the state in which the first information is not being output.

(16)

The information processing apparatus according to (15), wherein the output controller further causes a second output unit carried by each of the second users to output guidance information for prompting movement to the first place based on the positional information of the first place and the positional information and the directional information of each of the first users.

(17)

The information processing apparatus according to any one of (4) to (16), wherein the first output unit is a device of a head-mounted type.

(18)

An information processing apparatus comprising:

an information acquisition unit that acquires positional information of a first place with which first information is associated and positional information and directional information of each of a plurality of first users belonging to a first group; and an output controller that causes an output unit carried by each of a plurality of second users belonging to a second group to output guidance information for prompting movement to the first place based on the positional information of the first place and the positional information and the directional information of each of the first users.

(19)

A method for processing information comprising:

acquiring positional information of a first place with which first information is associated and positional information and directional information of each of a plurality of first users; and by a processor, controlling output of the first information by a first output unit carried by each of the first users based on the positional information of the first place and the positional information and the directional information of each of the first users.

(20)

A computer program causing a computer to function as:

an information acquisition unit that acquires positional information of a first place with which first information is associated and positional information and directional information of each of a plurality of first users; and an output controller that controls output of the first information by a first output unit carried by each of the first users based on the positional information of the first place and the positional information and the directional information of each of the first users.

REFERENCE SIGNS LIST

- 10 Server
- 20 Eyewear
- 22 Communication network
- 100, 200 Controller
- 102, 202 Information acquisition unit
- 104, 204 Output controller
- 120, 220 Communication unit
- 122, 228 Storage unit
- 206 Transmission controller
- 222 Sensor
- 224 Input unit
- 226 Output unit

The invention claimed is:

1. An information processing apparatus comprising: circuitry configured to acquire positional information of a first place with which first information is associated and positional information and directional information of each of a plurality of first users, the first place being a place within a real space and the positional information of the first place and the positional information of each of the first users being each positional information within the real space;

control output of the first information provided to each of the first users based on the positional information of the first place and the positional information and the directional information of each of the first users; and change an output state of the first information provided to each of the first users from a first state to a second state that is different from the first state, in a certain time based on the positional information of the first place and the positional information and the directional information of each of the first users, wherein the circuitry is configured to change the output state of the first information provided to each of the first users from the first state to the second state in the certain time based on whether, for each of the first users, a direction indicated by the directional information of the first user based on the positional information of the first user falls within a certain range of the first place and a distance between the positional information of the first place and the positional information of the first user.

2. The information processing apparatus according to claim 1, wherein when, for each of the first users, the direction indicated by the directional information of the first user based on the positional information of the first user falls within the certain range of the first place, and the distance between the positional information of the first place and the positional information of the first user is within a distance range corresponding to the first place, the circuitry is configured to change output controller changes the output state of the first information provided to each of the first users from the first state to the second state in the certain time, the first state is either one of a state in which the first information is being output and a state in which the first information is not being output, and the second state is another of the state in which the first information is being output and the state in which the first information is not being output.

3. The information processing apparatus according to claim 1, wherein the circuitry is configured to change the output state of the first information provided to each of the first users from the first state to the second state in the certain time further based on number of the first users.

4. The information processing apparatus according to claim 3, wherein when the number of the first users is within a number range corresponding to the first place, the circuitry is configured to change the output state of the first information provided to each of the first users from the first state to the second state in the certain time based on whether, for each of the first users, the direction indicated by the directional information of the first user based on the positional information of the first user falls within the certain range of the first place and the distance between the positional information of the first place and the positional information of the first user, while the number of the first users is out of the number range corresponding to the first place, the circuitry is configured to maintain the output state of the first information provided to each of the first users at the first state, the first state is either one of a state in which the first information is being output and a state in which the first information is not being output, and the second state is another of the state in which the first information is being output and the state in which the first information is not being output.

5. The information processing apparatus according to claim 3, wherein while the number of the first users is out of the number range corresponding to the first place, the circuitry is configured to maintain the output state of the first information provided to each of the first users at the first state and output, on a user device corresponding to at least one of the first users, notification information for providing notification of a difference between an upper limit or a lower limit of the number range corresponding to the first place and a current number of the first users, the first state is either one of a state in which the first information is being output and a state in which the first information is not being output, and the second state is another of the state in which the first information is being output and the state in which the first information is not being output.

6. The information processing apparatus according to claim 1, wherein the circuitry is configured to change the output state of the first information provided to each of the first users from the first state to the second state in the certain time further based on an arrangement shape determined based on the positional information of each of the first users.

7. The information processing apparatus according to claim 6, wherein when the arrangement shape determined based on the positional information of each of the first users becomes the same as an arrangement shape corresponding to the first place, the circuitry is configured to change the output state of the first information provided to each of the first users from the first state to the second state in the certain time based on whether, for each of the first users, the direction indicated by the directional information of the first user based on the positional information of the first user falls within the certain range of the first place and the distance between the positional information of the first place and the positional information of the first user, while the arrangement shape determined based on the positional information of each of the first users is different from the arrangement shape corresponding to the first place, the circuitry is configured to maintain the output state of the first information provided to each of the first users at the first state, the first state is either one of a state in which the first information is being output and a state in which the first information is not being output, and the second state is another of the state in which the first information is being output and the state in which the first information is not being output.

8. The information processing apparatus according to claim 6, wherein while the arrangement shape determined based on the positional information of each of the first users is different from an arrangement shape corresponding to the first place, the circuitry is configured to maintain the output state of the first information provided to each of the first users at the first state and causes the first output unit carried by at least one of the first users to output notification information for providing notification of the arrangement shape corresponding to the first place, the first state is either one of a state in which the first information is being output and a state in which the first information is not being output, and the second state is another of the state in which the first information is being output and the state in which the first information is not being output.

9. The information processing apparatus according to claim 1, wherein the circuitry is configured to change the output state of the first information provided to each of the first users from the first state to the second state in the certain time further based on relation of height information of each of the first users.

10. The information processing apparatus according to claim 9, wherein the circuitry is configured to change the output state of the first information provided to each of the first users from the first state to the second state in the certain time based on a three-dimensional arrangement shape determined based on the positional information and height information of each of the first users, the first state is either one of a state in which the first information is being output and a state in which the first information is not being output, and the second state is another of the state in which the first information is being output and the state in which the first information is not being output.

11. The information processing apparatus according to claim 1, wherein the circuitry is configured to change the output state of the first information provided to each of the first users from the first state to the second state in the certain time further based on relation among the positional information of the first place, the positional information of each of the first users, and positional information of a second object related to the first place within the real space, the first state is either one of a state in which the first information is being output and a state in which the first information is not being output, and the second state is another of the state in which the first information is being output and the state in which the first information is not being output.

12. The information processing apparatus according to claim 1, wherein the first users belong to a first group, the circuitry is configured to change the output state of the first information provided to each of the first users from the first state to the second state in the certain time further based on positional information of a second place with which second information is associated within the real space and positional information and directional information of each of a plurality second users belonging to a second group, the first state is either one of a state in which the first information is being output and a state in which the first information is not being output, and the second state is another of the state in which the first information is being output and the state in which the first information is not being output.

13. The information processing apparatus according to claim 12, wherein the circuitry is further configured to output, on a user device corresponding to each of the second users, guidance information for prompting movement to the first place based on the positional information of the first place and the positional information and the directional information of each of the first users.

14. The information processing apparatus according to claim 1, wherein the first information is provided to each of the first users via a device of a head-mounted type.

15. An information processing apparatus comprising:

circuitry configured to acquire positional information of a first place with which first information is associated and positional information and directional information of each of a plurality of first users belonging to a first group; and output, on a user device corresponding to each of a plurality of second users belonging to a second group, guidance information for prompting movement to the first place based on the positional information of the first place and the positional information and the directional information of each of the first users.

16. A method for processing information comprising:

acquiring positional information of a first place with which first information is associated and positional information and directional information of each of a plurality of first users, the first place being a place within a real space and the positional information of the first place and the positional information of each of the first users being each positional information within the real space;

controlling output of the first information provided to each of the first users based on the positional information of the first place and the positional information and the directional information of each of the first users; and changing an output state of the first information provided to each of the first users from a first state to a second state that is different from the first state, in a certain time based on the positional information of the first place and the positional information and the directional information of each of the first users, wherein, changing the output state of the first information provided to each of the first users from the first state to the second state is performed in the certain time based on whether, for each of the first users, a direction indicated by the directional information of the first user based on the positional information of the first user falls within a certain range of the first place and a distance between the positional information of the first place and the positional information of the first user.

17. A non-transitory computer-readable storage medium including computer executable instructions, wherein the instructions, when executed by an information processing system, cause the information processing system to perform a method, the method comprising:

acquiring positional information of a first place with which first information is associated and positional information and directional information of each of a plurality of first users, the first place being a place within a real space and the positional information of the first place and the positional information of each of the first users being each positional information within the real space;

controlling output of the first information provided to each of the first users based on the positional information of the first place and the positional information and the directional information of each of the first users; and changing an output state of the first information provided to each of the first users from a first state to a second state that is different from the first state, in a certain time based on the positional information of the first place and the positional information and the directional information of each of the first users, wherein, changing the output state of the first information provided to each of the first users from the first state to the second state is performed in the certain time based on whether, for each of the first users, a direction indicated by the directional information of the first user based on the positional information of the first user falls within a certain range of the first place and a distance between the positional information of the first place and the positional information of the first user.

* * * * *